(12) United States Patent
Maurer et al.

(10) Patent No.: US 10,160,656 B2
(45) Date of Patent: Dec. 25, 2018

(54) ORGANOTEMPLATE-FREE SOLID-STATE SYNTHETIC METHOD FOR ZEOLITE MOLECULAR SIEVES

(71) Applicant: BASF SE, Ludwigshafen (DE)

(72) Inventors: Stefan Maurer, Shanghai Pudong (CN); Ulrich Müller, Neustadt (DE); Feng-Shou Xiao, Changchun (CN); Xiangju Meng, Hangzhou Zejiang Province (CN); Qinming Wu, Hangzhou (CN)

(73) Assignee: BASF SE, Ludwigshafen (DE)

( * ) Notice: Subject to any disclaimer, the term of this patent is extended or adjusted under 35 U.S.C. 154(b) by 612 days.

(21) Appl. No.: 14/649,637

(22) PCT Filed: Dec. 5, 2013

(86) PCT No.: PCT/CN2013/088654
§ 371 (c)(1),
(2) Date: Jun. 4, 2015

(87) PCT Pub. No.: WO2014/086300
PCT Pub. Date: Jun. 12, 2014

(65) Prior Publication Data
US 2015/0298983 A1 Oct. 22, 2015

(30) Foreign Application Priority Data
Dec. 9, 2012 (CN) .......................... 2012 1 0535629

(51) Int. Cl.
| | | |
|---|---|---|
| C01B 39/46 | (2006.01) | |
| C01B 39/02 | (2006.01) | |
| C01B 39/38 | (2006.01) | |
| C01B 39/20 | (2006.01) | |
| C01B 39/26 | (2006.01) | |
| B01J 29/08 | (2006.01) | |
| B01J 29/18 | (2006.01) | |
| B01J 29/70 | (2006.01) | |
| B01J 35/00 | (2006.01) | |
| B01J 35/10 | (2006.01) | |
| B01J 29/40 | (2006.01) | |
| B01J 37/00 | (2006.01) | |
| B01J 37/04 | (2006.01) | |
| C01B 39/14 | (2006.01) | |

(52) U.S. Cl.
CPC .............. *C01B 39/46* (2013.01); *B01J 29/08* (2013.01); *B01J 29/18* (2013.01); *B01J 29/40* (2013.01); *B01J 29/70* (2013.01); *B01J 35/002* (2013.01); *B01J 35/1023* (2013.01); *B01J 35/1038* (2013.01); *B01J 37/009* (2013.01); *B01J 37/04* (2013.01); *C01B 39/02* (2013.01); *C01B 39/14* (2013.01); *C01B 39/20* (2013.01); *C01B 39/26* (2013.01); *C01B 39/38* (2013.01)

(58) Field of Classification Search
CPC ......... C01B 39/14; C01B 39/20; C01B 39/26; C01B 39/38; C01B 39/46; C01B 39/02
See application file for complete search history.

(56) References Cited

FOREIGN PATENT DOCUMENTS

| | | | | |
|---|---|---|---|---|
| CN | 102285667 | | 12/2011 | |
| CN | 102627287 | | 8/2012 | |
| CN | 102992343 | | 3/2013 | |
| CN | 102627287 B | * | 4/2014 | ............ C01B 39/04 |
| WO | WO-01/12547 | | 2/2001 | |

OTHER PUBLICATIONS

Robson, ed., Verified Synthesis of Zeolitic Materials, 2$^{nd}$ Rev. Ed., Elsevier, (2001).*
Ren et al, Solvent free sythesis of Zeolites from Solid Raw Materials, JACS, (Sep. 2012) Supplemental Material.*
PCT International Preliminary Report on Patentability in PCT/CN2013/088654, dated Jun. 9, 2015, 8 pages.
PCT International Search Report in PCT/CN2013/088654, dated Mar. 13, 2015, 4 pages.

* cited by examiner

*Primary Examiner* — David M Brunsman
(74) *Attorney, Agent, or Firm* — Oblon, McClelland, Maier & Neustadt, L.L.P.

(57) ABSTRACT

Described is a preparation method for zeolite molecular sieves by means of solid-state reactions without the usage of organic templates. The method comprises the following steps: grinding and mixing the solid raw materials comprising the silicon source, the aluminum source and the alkali source, transferring the obtained mixture into an autoclave, conducting the crystallization for a period of 5 hours-20 days at a temperature of 50-200° C. After filtering and drying the crystallized products, molecular sieves in a powder form can be obtained. The method provides different molecular sieves, including ZSM-5 zeolite, Beta zeolite, FAU zeolite, MOR zeolite, LTA zeolite, and GIS zeolite, with a high crystallinity and an adjustable Si/Al ratio within a certain range. The obtained products exhibit a high crystallinity and a high purity, and the method does not require the use of organic templates and solvents, which avoids unnecessary consumptions during the production, simplifies the synthetic process, and also increases the yield from the autoclave reactor.

9 Claims, 25 Drawing Sheets

ORGANOTEMPLATE-FREE SOLID-STATE SYNTHETIC METHOD FOR ZEOLITE MOLECULAR SIEVES

CROSS-REFERENCE TO RELATED APPLICATIONS

This application is the National Stage Entry of PCT/CN2013/088654, filed on Dec. 5, 2013, which claims priority to Chinese Patent Application No. 201210535629.7, filed on Dec. 9, 2012, the disclosures of which are incorporated herein by reference in their entireties.

TECHNICAL FIELD

The present invention relates to the field of molecular sieve synthesis, and especially relates to the method combining the solid-state and organotemplate-free approaches for the synthesis of molecular sieves.

BACKGROUND

Due to their open structure and large surface area, molecular sieves have been widely used in catalysis, ion exchange, adsorption, separation and so on. Therefore, the research on molecular sieves is of high importance for the chemical industry, and there is a strong need to develop new synthetic routes for molecular sieves. In the early stage of the molecular sieve research, molecular sieves were synthesized under hydrothermal conditions, and only limited types of molecular sieves were synthesized including zeolites A, X, Y, L, and so on. In the late 1960s, the introduction of organic template agents led to the synthesis of various novel molecular sieves, such as ZSM-5, Beta, which are of high importance in the chemical industry.

In recent years, researchers started to use organotemplate-free methods for the synthesis of zeolite molecular sieves, such as ECR-1, ZSM-34, Beta, ZSM-12, RuB-13 and so on. The organotemplate-free method avoids several issues related to the use of organic templates in the zeolite synthesis, for example, unfavorable costs, waste of energy and release of hazardous gases from the template calcination process as well as the inherent toxicity of many organic template agents. More recently, the group of Xiao has successfully synthesized Silicate-1, ZSM-5, ZSM-39 and other zeolites by using a novel synthetic method which includes grinding the raw materials in a solid-state under solvent-free conditions and subsequent crystallization (called solid-state method for short). This solid-state method minimizes the consumption of aqueous solvents, and simplifies the molecular sieve synthesis, which has the potential to reduce the overall production cost as well as the waste that has to be discharged.

However, the above two synthetic methods both have their own disadvantages. The organotemplate-free synthetic method containing a hydrothermal process requires the consumption of a large amount of aqueous solvent; whereas for the solid-state method, organic template with all inherent issues has to be employed. The present invention provides a novel organotemplate-free and solid-state synthetic method which enables a "green" synthetic route for molecular sieves, leading to a low cost production, low energy consumption and almost zero pollution.

SUMMARY

A first aspect of the present invention is directed to an organotemplate-free solid-state method for the synthesis of zeolite molecular sieves. In a first embodiment, an organotemplate-free solid-state method for the synthesis of zeolite molecular sieves, comprises grinding and mixing the weighed solid raw materials comprising the silicon source, the aluminum source and the alkali source; transferring the mixture into an autoclave; crystallizing the mixture at temperatures of between 50-200° C. for a time period of from 5 hours to 20 days; and filtering and drying the product for obtaining powders of molecular sieves; wherein each raw material is added within a molar ratio range of $SiO_2$:(0.016-0.5) $Al_2O_3$:(0.1-0.7) $Na_2O$:(1.5-3) $H_2O$.

In a second embodiment, the method of the first embodiment is modified, wherein each raw material is added within a molar ratio range of $SiO_2$:0.25 $Al_2O_3$:0.39 $Na_2O$:(2-3) $H_2O$.

In a third embodiment, the method of the first and second embodiments is modified, wherein each raw material is added within a molar ratio range of $SiO_2$:0.05 $Al_2O_3$:(0.1-0.16) $Na_2O$:(2-3) $H_2O$.

In a fourth embodiment, the method of the first through third embodiments is modified, wherein each raw material is added within a molar ratio range of $SiO_2$:0.1 $Al_2O_3$:0.39 $Na_2O$:(2-3) $H_2O$.

In a fifth embodiment, the method of the first through fourth embodiments is modified, wherein each raw material is added within a molar ratio range of $SiO_2$:0.5 $Al_2O_3$:0.7 $Na_2O$:(3-4) $H_2O$.

In a sixth embodiment, the method of the first through fifth embodiments is modified, wherein molecular sieve seed crystals are added and grinded together with the solid raw materials before crystallization, and wherein the mass ratio of the molecular sieve seed crystals to the raw silicon source is in a range of 1-10%.

In a seventh embodiment, the method of the sixth embodiment is modified, wherein each raw material is added within a molar ratio range of $SiO_2$:(0.016-0.05) $Al_2O_3$:(0.14-0.25) $Na_2O$:(1.5-3) $H_2O$.

In an eighth embodiment, the method of the sixth and seventh embodiments is modified, wherein each raw material is added within a molar ratio range of $SiO_2$:(0.056-0.083) $Al_2O_3$:(0.14-0.2) $Na_2O$:(2-3) $H_2O$.

In a ninth embodiment, the method of the first through eighth embodiments is modified, wherein the aluminum source is selected from aluminum sulfate or sodium aluminate; the silicon source is selected from sodium silicate, solid silica gel, white carbon black or amorphous silica powder; and the alkali source is selected from sodium hydroxide or sodium silicate.

DETAILED DESCRIPTION

Figure 1:
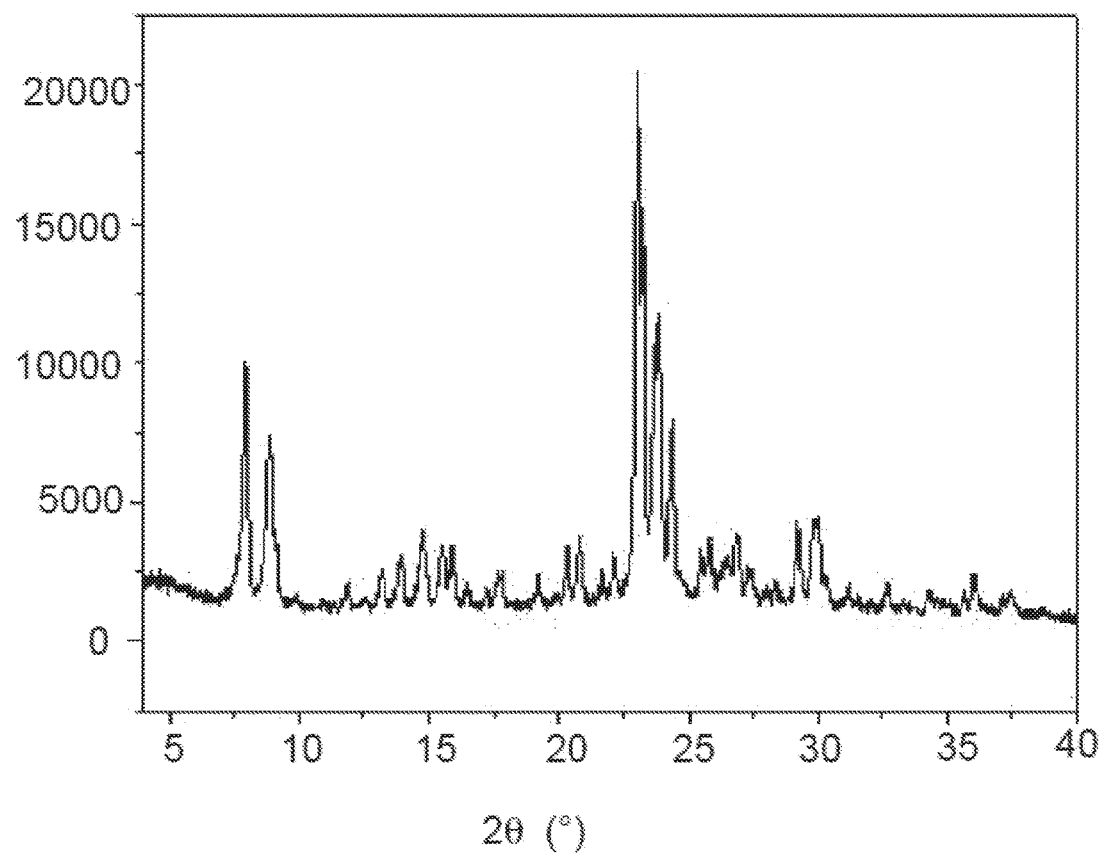
FIG. 1: XRD spectrum of the product obtained from Example 1.

Provided is an organotemplate-free solid-state synthetic method overcomes the disadvantages of the molecular sieve synthesis known in the prior art and provides for zeolites including ZSM-5, Beta, FAU, MOR, LTA, and GIS molecular sieves.

The organotemplate-free solid-state synthetic method for molecular sieves provided by the present invention comprises the following steps:

Grinding and mixing the weighed solid raw materials comprising the silicon source, the aluminum source and the alkali source, then transferring the solid mixture into an autoclave and conducting crystallization for a time period from 5 hours to 20 days at temperatures of 50-200° C., and after a suction filtration and subsequent drying of the products, powders of molecular sieves can be obtained. In one or more embodiments, each raw material shall be added within a molar ratio range of $SiO_2$:(0.016-0.5) $Al_2O_3$:(0.1-0.7) $Na_2O$:(1.5-3) $H_2O$.

According to one or more embodiments of the present invention, each raw material shall be added within a molar ratio range of $SiO_2$:0.25 $Al_2O_3$:0.39 $Na_2O$:(2-3) $H_2O$.

According to one or more specific embodiments of the present invention, each raw material shall be added within a molar ratio range of $SiO_2$:0.05 $Al_2O_3$:(0.1-0.16) $Na_2O$:(2-3) $H_2O$.

According to other specific embodiments of the present invention, each raw material shall be added within a molar ratio range of $SiO_2$:0.1 $Al_2O_3$:0.39 $Na_2O$:(2-3) $H_2O$.

According to further specific embodiments of the present invention, each raw material shall be added within a molar ratio range of $SiO_2$:0.5 $Al_2O_3$:0.7 $Na_2O$:(3-4) $H_2O$.

According to one or more embodiments of the present invention, molecular sieve seed crystals are mixed and grinded together with the solid raw materials before crystallization. The mass ratio of said molecular sieve seed crystals to the silicon source is within a range of 1-10%.

According to one or more embodiments, when molecular sieve seed crystals are added during the synthesis, each raw material shall be added within a molar ratio range of $SiO_2$:(0.016-0.05) $Al_2O_3$:(0.14-0.25) $Na_2O$:(1.5-3) $H_2O$.

According to one or more specific embodiments, when molecular sieve seed crystals are added during the synthesis, each raw material shall be added within a molar ratio range of $SiO_2$:(0.056-0.083) $Al_2O_3$:(0.14-0.2) $Na_2O$:(2-3) $H_2O$.

According to one or more embodiments, the aluminum source is aluminum sulfate or sodium aluminate; the silicon source is hydrated sodium silicate ($Na_2SiO_4.9H_2O$), solid silica gel, white carbon black or amorphous silica powder; and the alkali source is sodium hydroxide or hydrated sodium silicate.

The present invention has the following beneficial technical effects:

Based on the solution of the present invention, ZSM-5 zeolite, Beta zeolite, FAU zeolite, MOR zeolite, LTA zeolite, and GIS zeolite with a high crystallinity and an adjustable Si/Al ratio within a certain range can be obtained.

Compared to the prior art, the zeolite products obtained by the present invention have a high crystallinity and a high phase purity, and the whole production process is free of organic template agents and solvents, thus avoiding unnecessary consumption during the production process. Moreover, the synthetic method of the present invention simplifies the production of zeolites, and improves the yield of the zeolitic products obtained from the autoclave reactor. Therefore, this "green" synthetic route will significantly reduce the production costs, which may find potential application in the production of zeolites in the chemical industry.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

X-ray powder diffraction (XRD) patterns were measured with a Rigaku Ultimate VI X-ray diffractometer (40 kV, 40 mA) using $Cu_{K\alpha}$ ($\lambda$=1.5406 Å) radiation. The $N_2$ sorption isotherms at the temperature of liquid nitrogen were measured using Micromeritics ASAP 2020M and Tristar system.

The sample composition was determined by inductively coupled plasma (ICP) with a Perkin-Elmer 3300DV emission spectrometer. Scanning electron microscopy (SEM) experiments were performed on Hitachi SU-1510 electron microscopes. $^{29}$Si MAS NMR spectra were recorded on a Varian Infinity Plus 400 spectrometer.

Example 1

Synthesis of Low Si/Al Ratio ZSM-5 Zeolite by the Organotemplate-free Solid-state Method 2 g of $Na_2SiO_3.9H_2O$, 0.92 g of $Al_2(SO_4)_3.18H_2O$, 1.3 g of solid silica gel and 0.17 g of ZSM-5 seed crystals (the amount of seed crystals is calculated with respect to the amount of raw silicon source) were poured into a mortar and mixed by grinding for 10 minutes. The mixture was then transferred into a polytetrafluorethylene lined stainless steel autoclave and the crystallization was conducted at 180° C. for 15 hours until the crystallization was complete. The product was filtered by suction filtration and followed by a drying step to obtain the final product in a powder form. The composition of the synthetic mixture is as follows: $SiO_2$:0.05 $Al_2O_3$:0.25 $Na_2O$:3 $H_2O$. The mass ratio of seed crystals to the raw silicon source is 10%.

It is determined by the X-ray diffraction analysis that the obtained product is a ZSM-5 zeolite.

Figure 2:
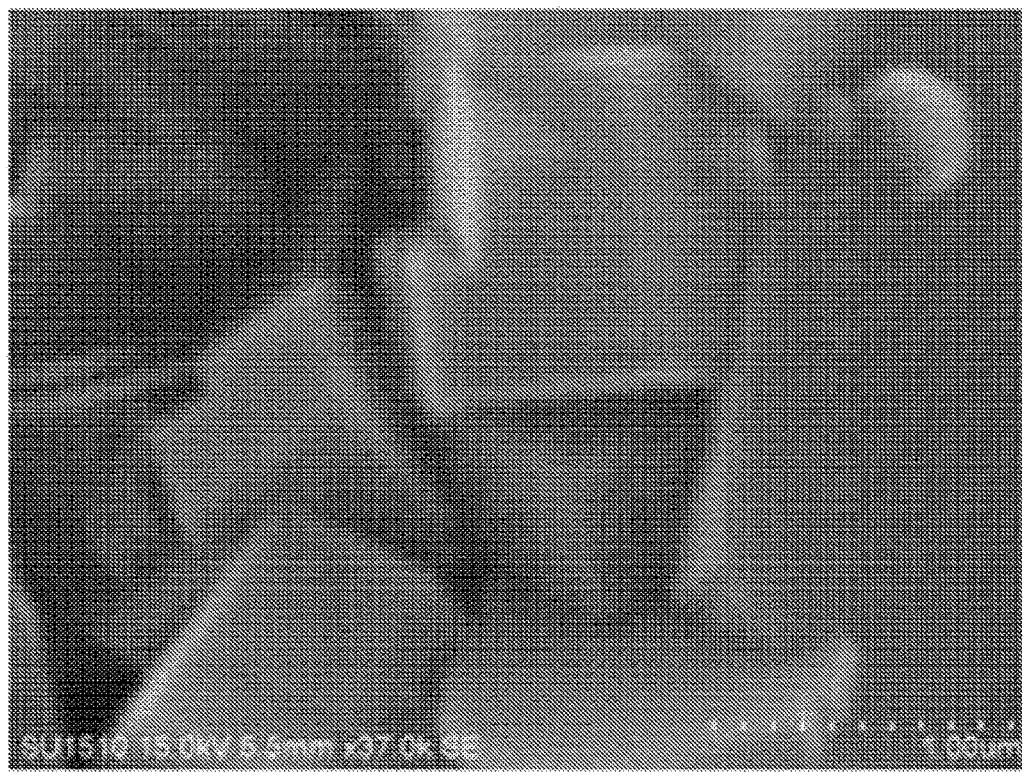
FIG. 2: SEM image of the product obtained from Example 1.
Figure 3:
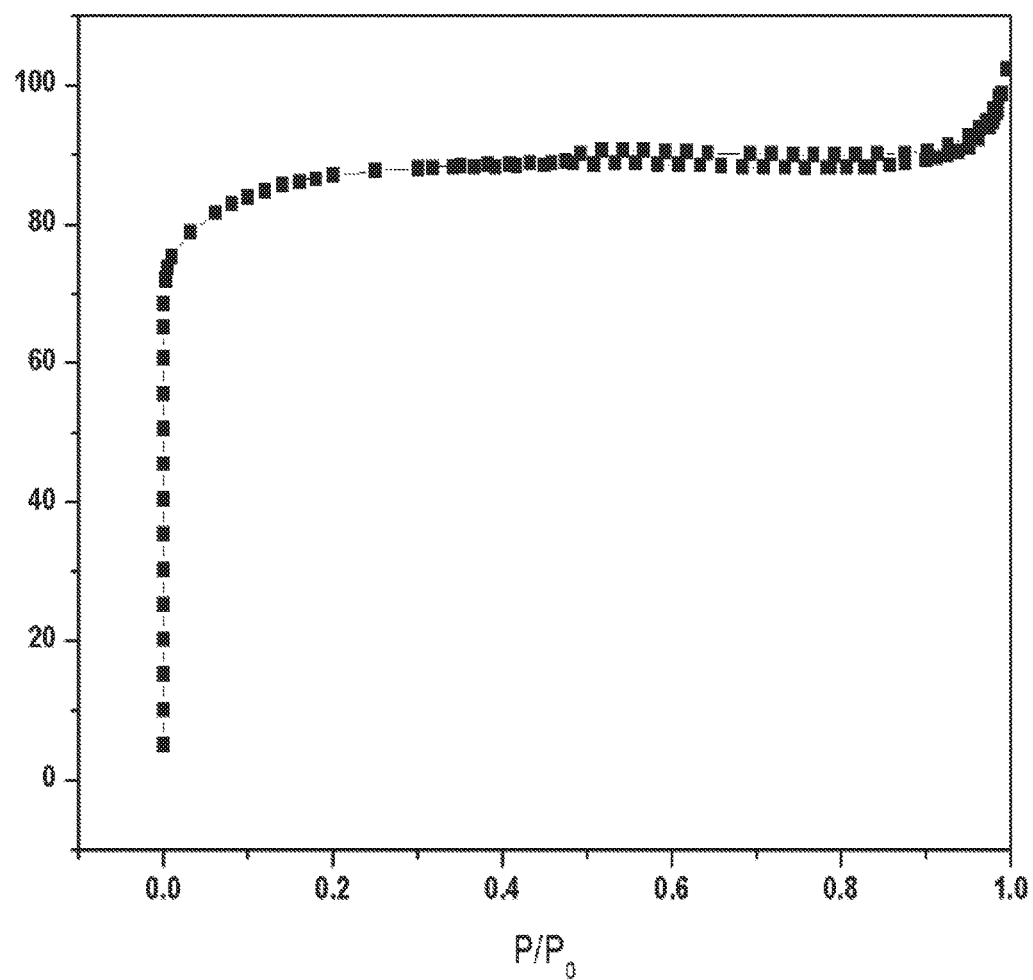
FIG. 3: Nitrogen adsorption sorption isotherm of the product obtained from Example 1.

FIG. 1 and FIG. 2 show respectively the XRD pattern and SEM image of the product synthesized accordingly to Example 1.

Example 2

Utilization of the ZSM-5 Zeolite Synthesized by the Organotemplate-free Solid-state Method of Example 1 as Seed Crystals 2 g of $Na_2SiO_3.9H_2O$, 0.92 g of $Al_2(SO_4)_3.18H_2O$, 1.3 g of solid silica gel and 0.17 g of ZSM-5 seed crystals obtained from Example 1 were poured into a mortar and mixed by grinding for 10 minutes. The mixture than was transferred into a polytetrafluorethylene lined stainless steel autoclave and crystallization was conducted at 180° C. for 15 hours until the crystallization was complete. The product was filtered off by suction filtration followed by a drying step to obtain the final product in a powder form. The composition of the synthetic mixture is as follows: $SiO_2$:0.05 $Al_2O_3$:0.25 $Na_2O$:3 $H_2O$. The mass ratio of seed crystals to the raw silicon source is 10%.

Figure 4:
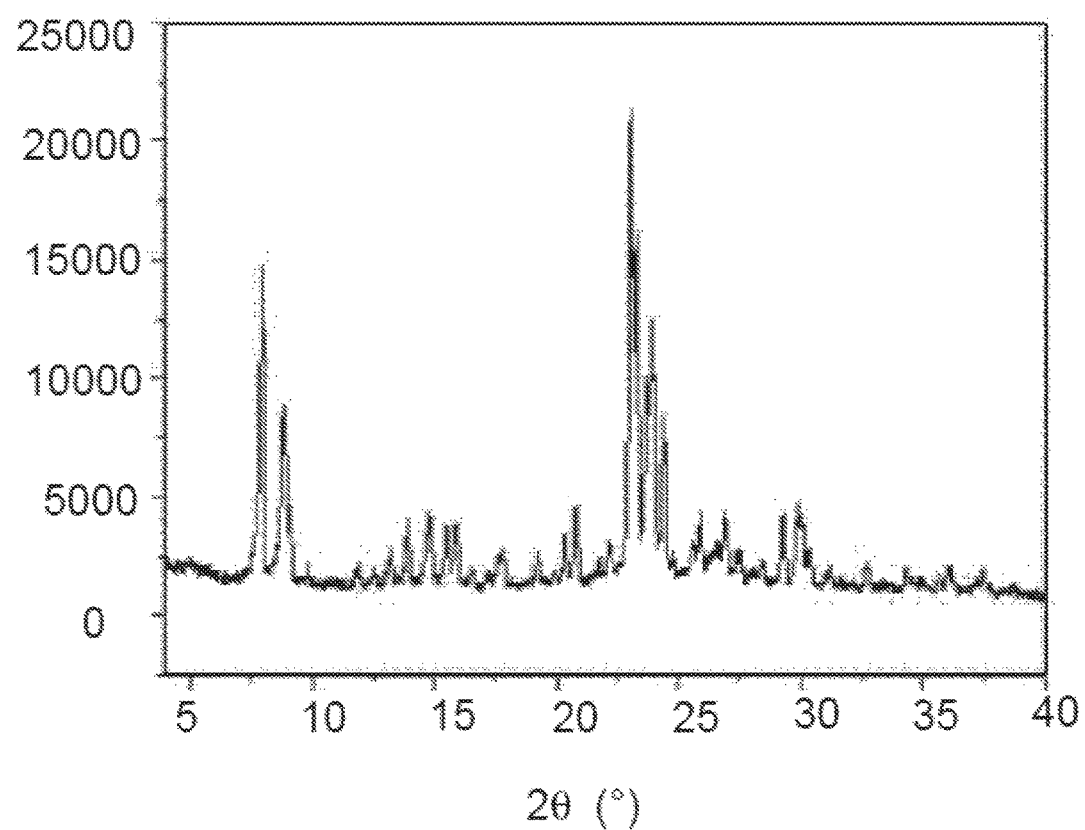
FIG. 4: XRD pattern of the product obtained from Example 2.
Figure 5:
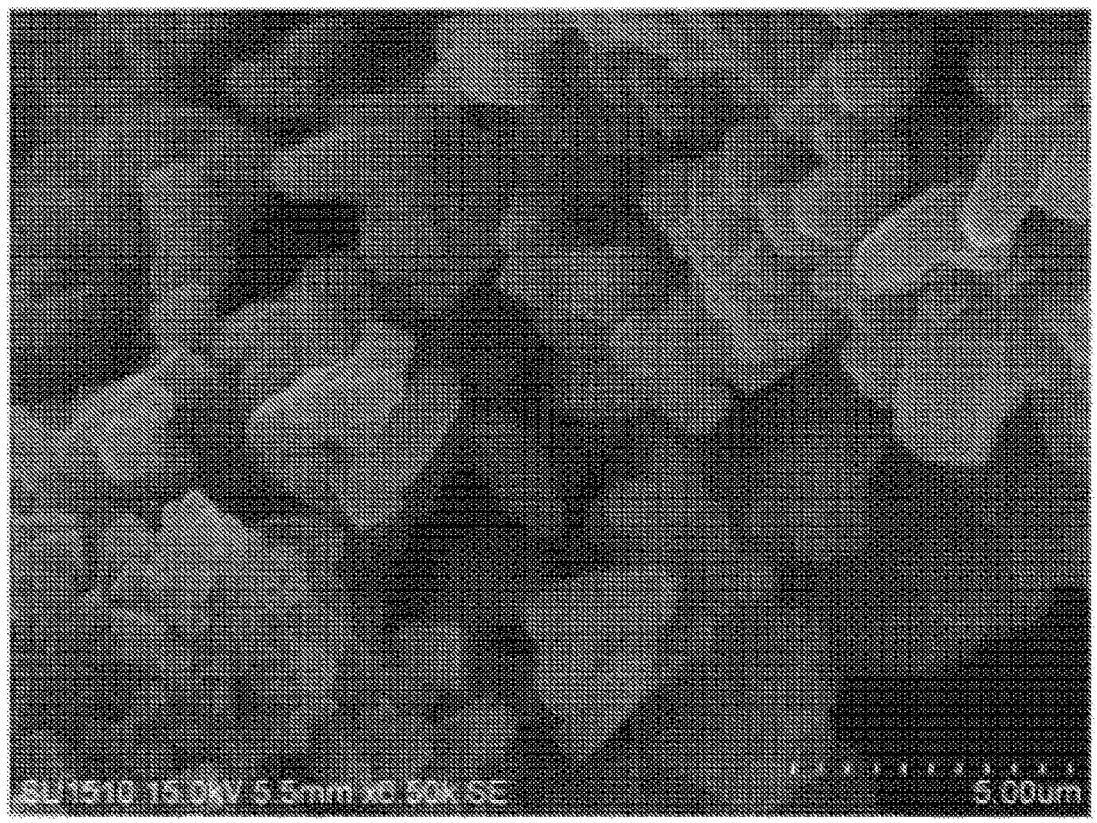
FIG. 5: SEM image of the product obtained from Example 2.
Figure 6:
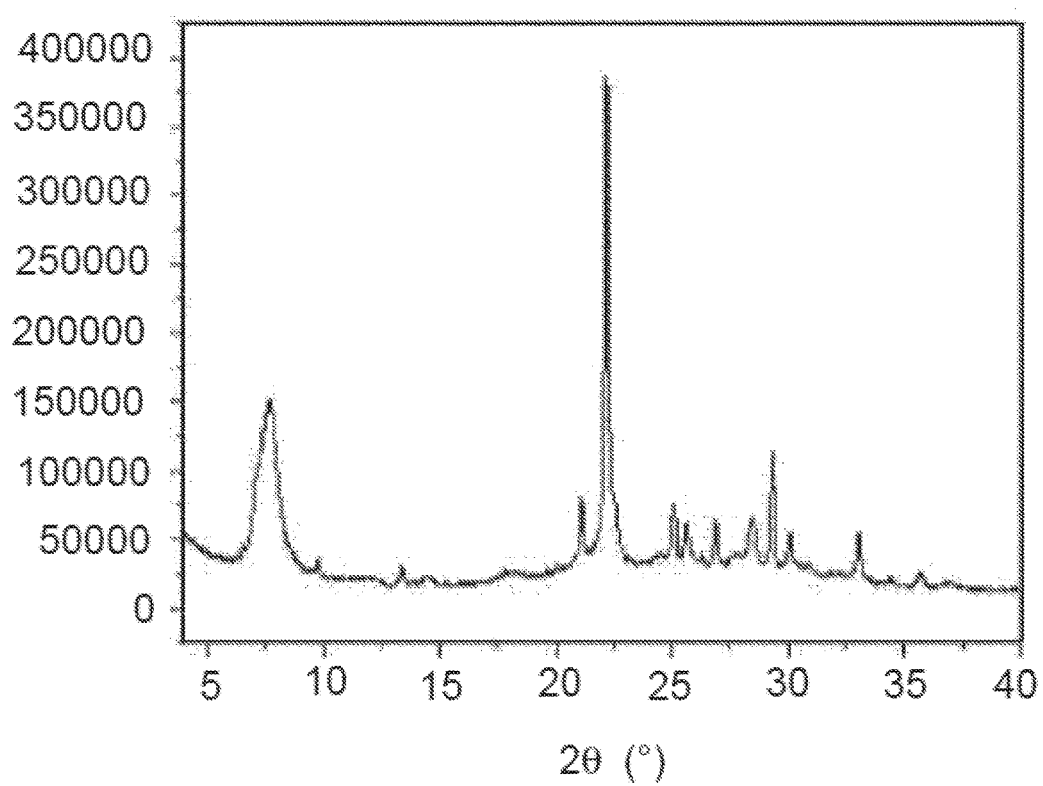
FIG. 6: XRD pattern of the product obtained from Example 9.
Figure 7:
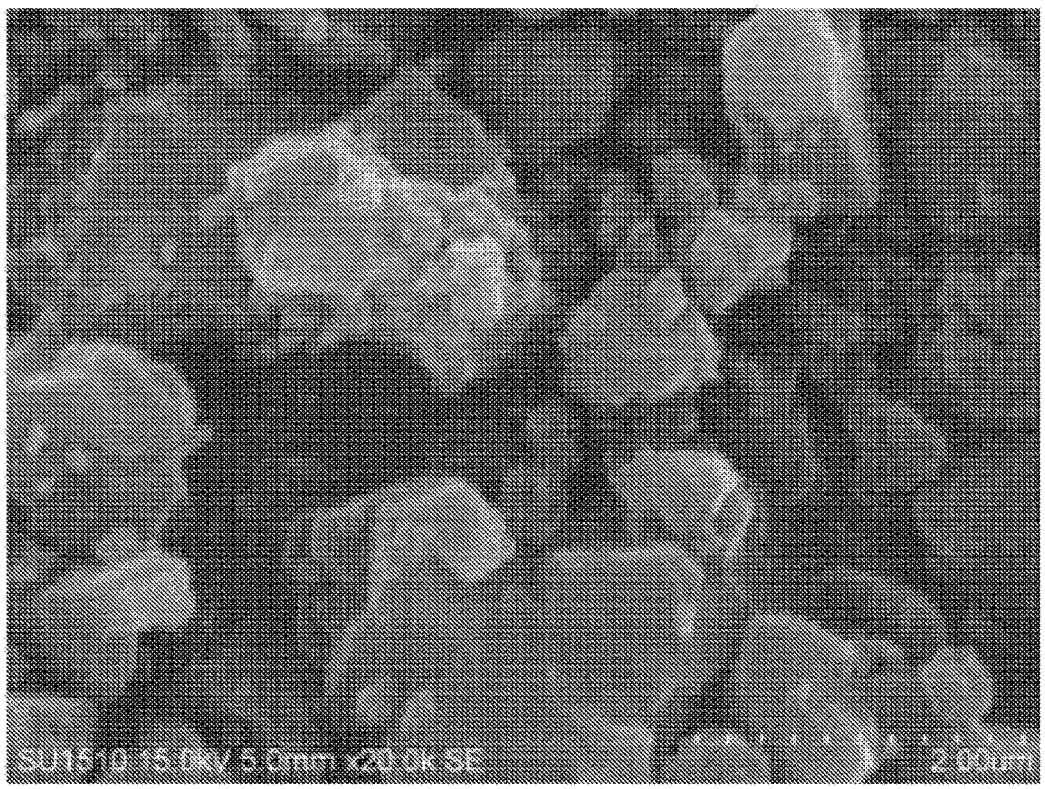
FIG. 7: SEM image of the product obtained from Example 9.
Figure 8:
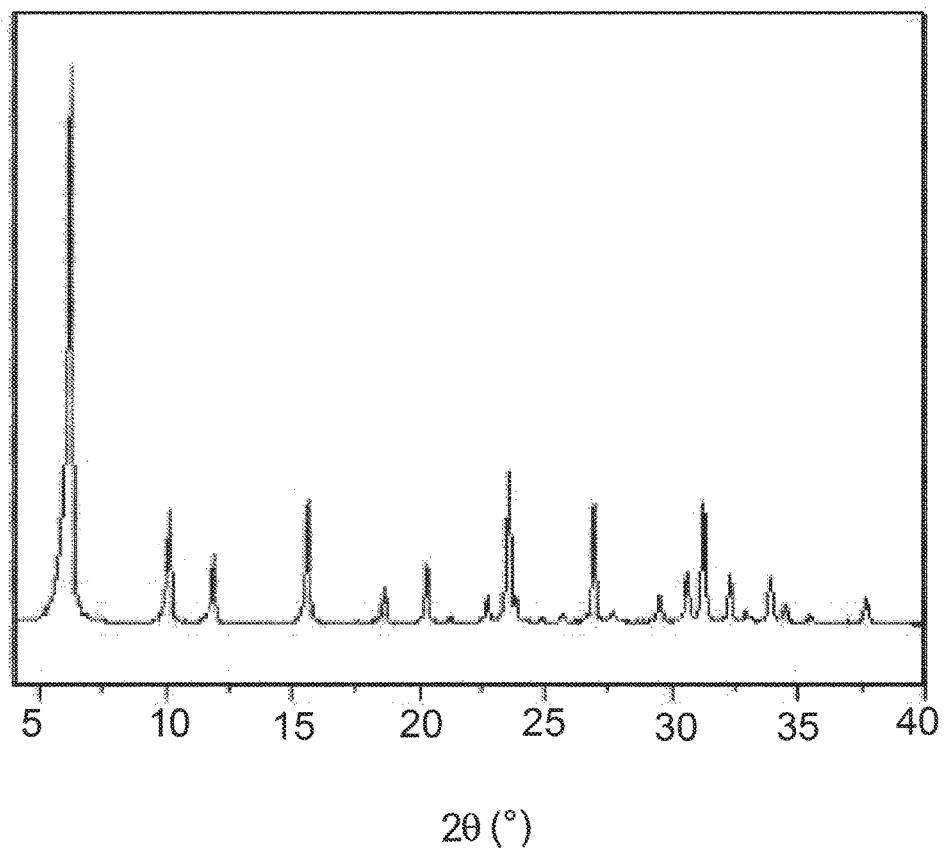
FIG. 8: XRD pattern of the product obtained from Example 13.
Figure 9:
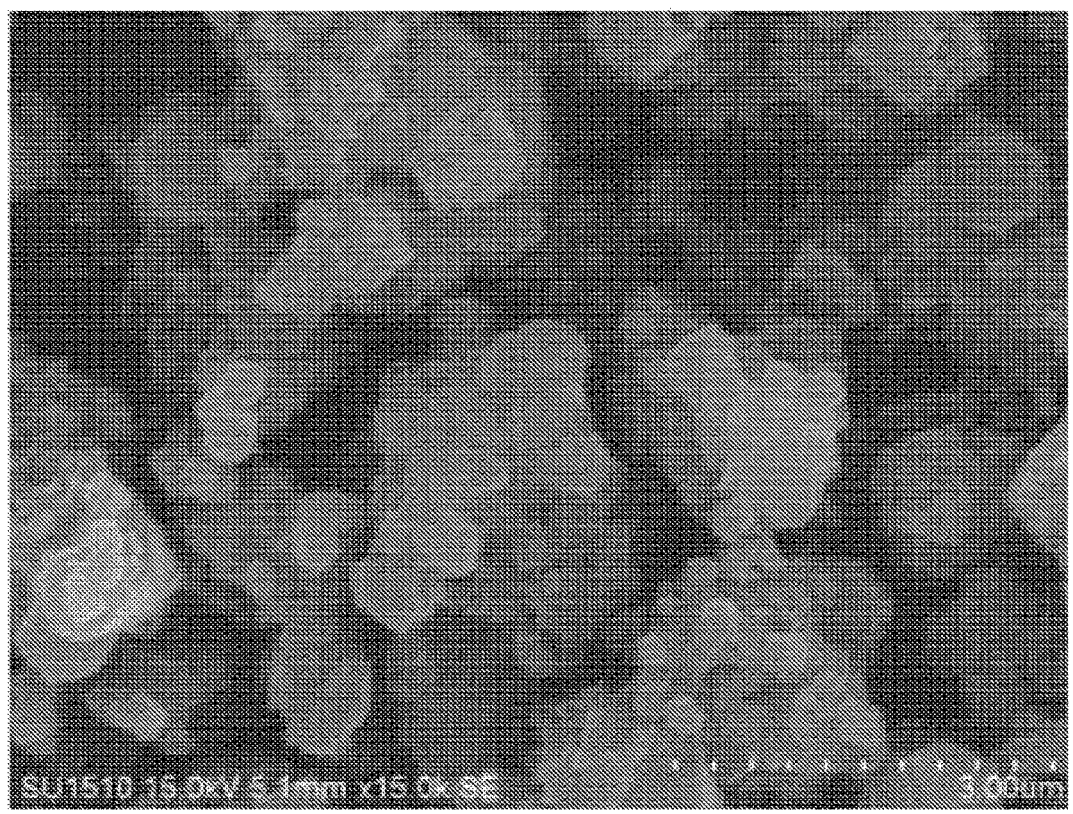
FIG. 9: SEM image of the product obtained from Example 13.
Figure 10:
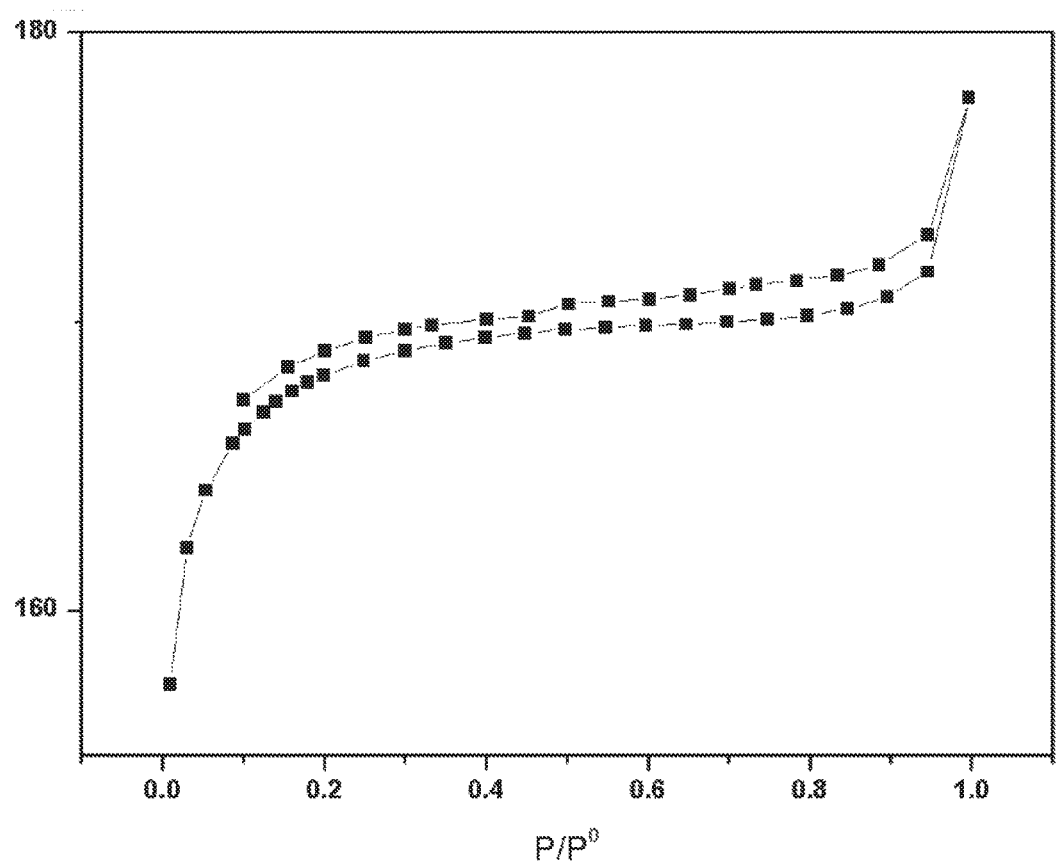
FIG. 10: Nitrogen sorption isotherm of the product obtained from Example 13.
Figure 11:
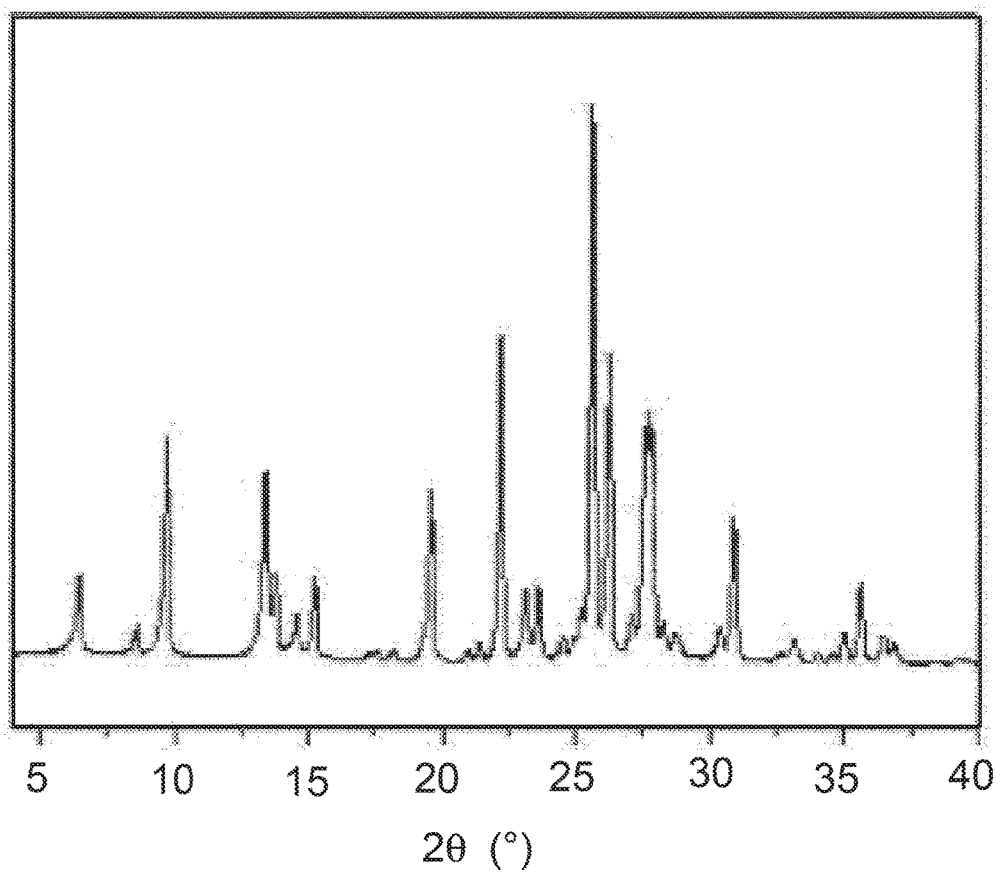
FIG. 11: XRD pattern of the product obtained from Example 16.
Figure 12:
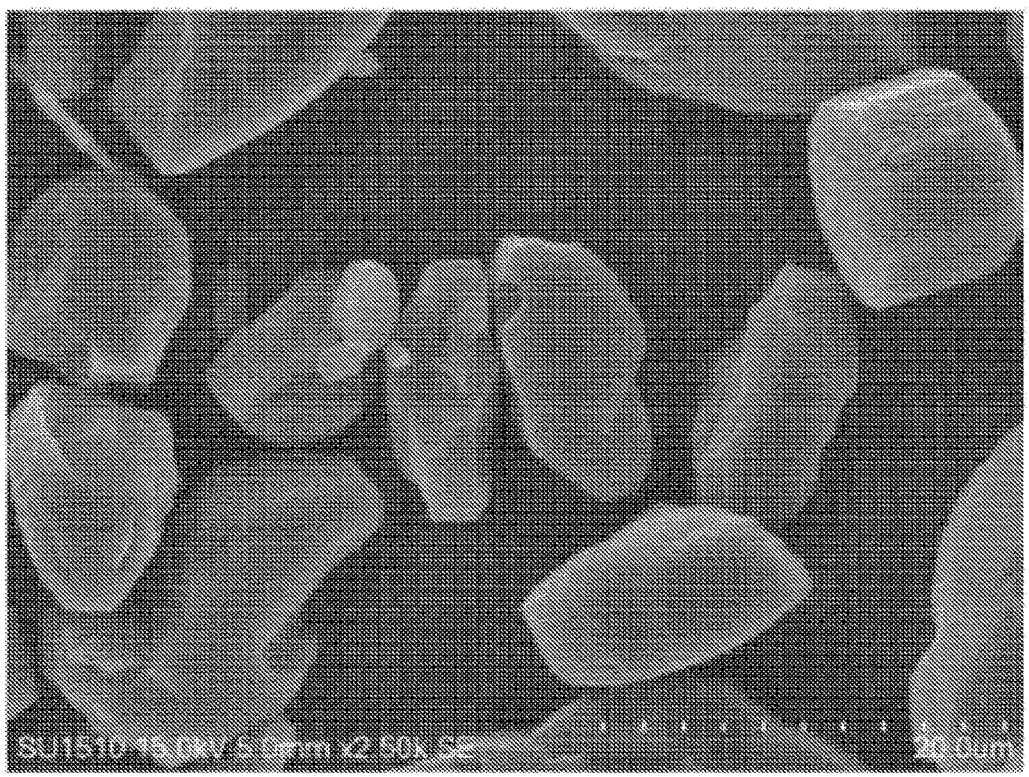
FIG. 12: SEM image of the product obtained from Example 16.
Figure 13:
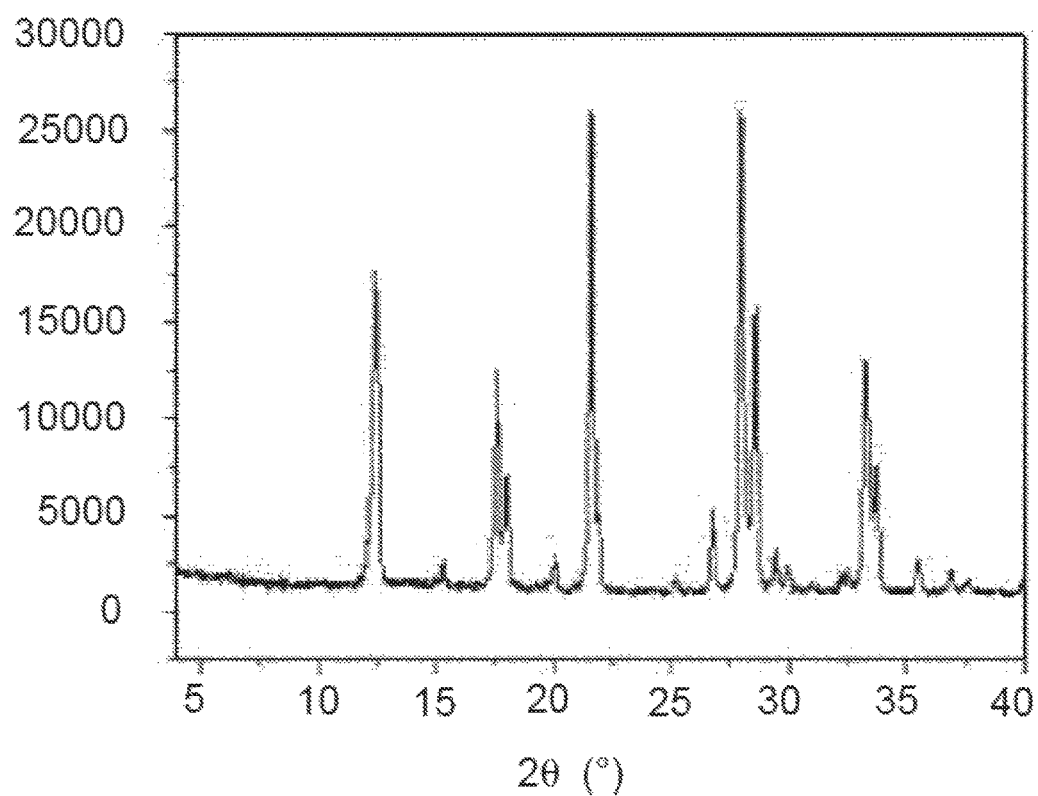
FIG. 13: XRD pattern of the product obtained from Example 19.
Figure 14:
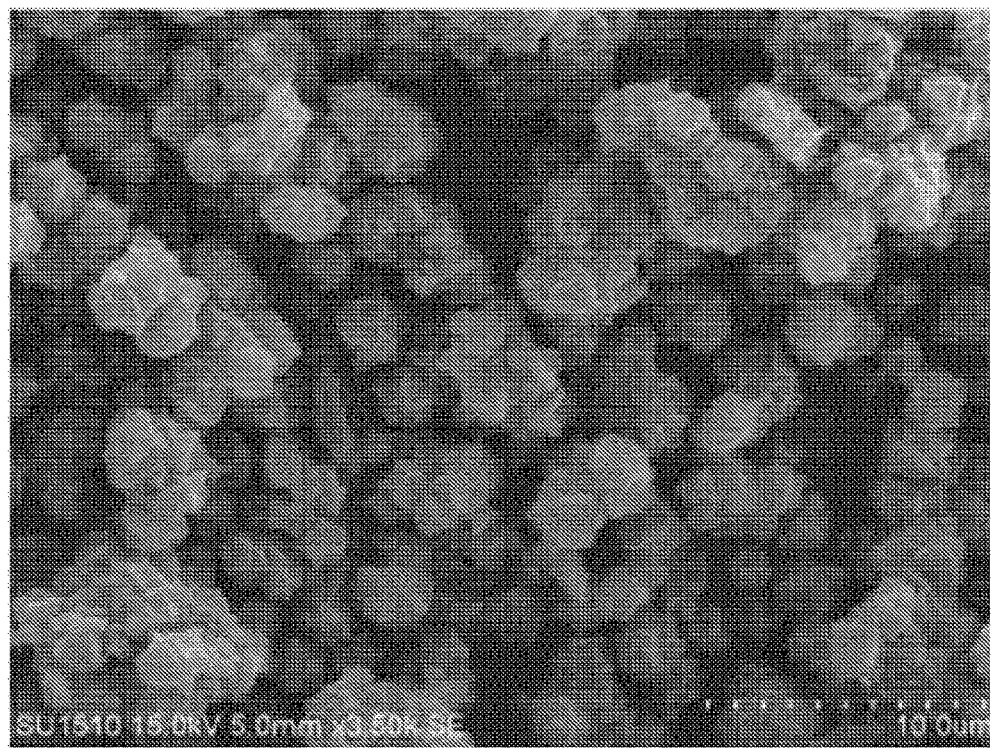
FIG. 14: SEM image of the product obtained from Example 19.
Figure 15:
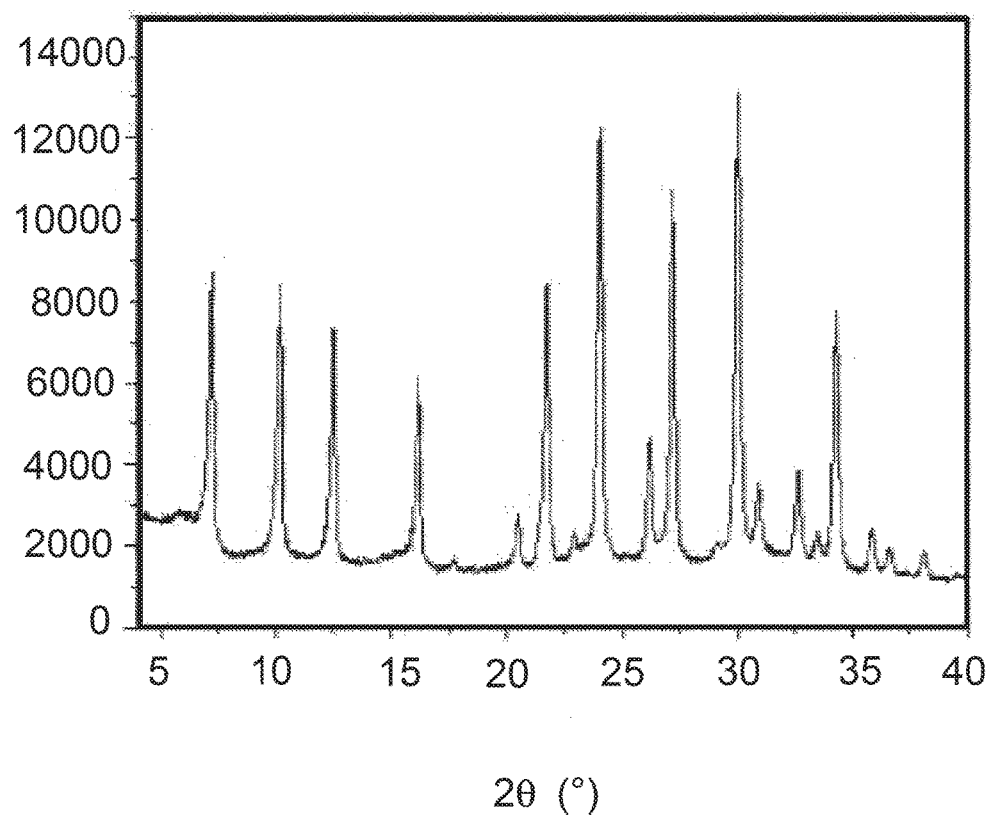
FIG. 15: XRD pattern of the product obtained from Example 20.

It is determined by the X-ray diffraction analysis that the obtained product is a ZSM-5 zeolite FIG. 4 and FIG. 5 show respectively the XRD pattern and SEM image of the product synthesized according to Example 2, indicating that the ZSM-5 zeolite synthesized by the described method can be used as seed crystals in further syntheses.

Example 3

Synthesis of High Si/Al Ratio ZSM-5 Zeolite by the Organotemplate-free Solid-state Method 1.1 g of $Na_2SiO_3.9H_2O$, 0.3 g of $Al_2(SO_4)_3.18H_2O$, 1.4 g of solid silica gel and 0.17 g of ZSM-5 seed crystals (the amount of seed crystals is calculated with respect to the amount of raw silicon source) were poured into a mortar and mixed by grinding for 10 minutes. The mixture was then transferred into a polytetrafluorethylene lined stainless steel autoclave and crystallization was conducted at 180° C. for 15 hours until the crystallization was complete. The product was filtered by suction filtration and followed by a drying step to obtain the final product in a powder form. The composition of the synthetic mixture is as follows: $SiO_2$:0.016 $Al_2O_3$:0.14 $Na_2O$:1.5 $H_2O$. The mass ratio of seed crystals to the raw silicon source is 10%. It is determined by the X-ray diffraction analysis that the obtained product is a ZSM-5 zeolite.

Example 4

Synthesis of ZSM-5 Zeolite by the Organotemplate-free Solid-state Method 1.5 g of $Na_2SiO_3.9H_2O$, 0.65 g of $Al_2(SO_4)_3.18H_2O$, 1.35 g of solid silica gel and 0.17 g of ZSM-5 seed crystals (the amount of seed crystals is calculated with respect to the amount of raw silicon source) were poured into a mortar and mixed by grinding for 10 minutes. The mixture was then transferred into a polytetrafluorethylene lined stainless steel autoclave and crystallization was conducted at 180° C. for 15 hours until the crystallization was completed. The product was filtered by suction filtration and followed by a drying step to obtain the final product in a powder form. The composition of the synthetic mixture is as follows: $SiO_2$:0.034 $Al_2O_3$:0.19 $Na_2O$:2.3 $H_2O$. The mass ratio of seed crystals to the raw silicon source is 10%. It is determined by the X-ray diffraction analysis that the obtained product is a ZSM-5 zeolite.

Example 5

Synthesis of ZSM-5 Zeolite at a High Temperature in a Short Time 1.5 g of $Na_2SiO_3.9H_2O$, 0.65 g of $Al_2(SO_4)_3.18H_2O$, 1.35 g of solid silica gel and 0.17 g of ZSM-5 seed crystals (the amount of seed crystals is calculated with respect to the amount of raw silicon source) were poured into a mortar and mixed by grinding for 10 minutes. The mixture than was transferred into a polytetrafluorethylene lined stainless steel autoclave and the crystallization was conducted at 200° C. for 5 hours until the crystallization was complete. The product was filtered by suction filtration followed by a drying step to obtain the final product in a powder form. The composition of the synthetic mixture is as follows: $SiO_2$:0.034 $Al_2O_3$:0.19 $Na_2O$:2.3 $H_2O$. The mass ratio of seed crystals to the raw silicon source is 10%. It is determined by the X-ray diffraction analysis that the obtained product is a ZSM-5 zeolite.

Example 6

Synthesis of ZSM-5 Zeolite at a Low Temperature in a Short Time 1.5 g of $Na_2SiO_3.9H_2O$, 0.65 g of $Al_2(SO_4)_3.18H_2O$, 1.35 g of solid silica gel and 0.17 g of ZSM-5 seed crystals (the amount of seed crystals is calculated with respect to the amount of raw silicon source) were poured into a mortar and mixed by grinding for 10 minutes. The mixture than was transferred into a polytetrafluorethylene lined stainless steel autoclave and the crystallization was conducted at 150° C. for 4 days until the crystallization was complete. The product was filtered by suction filtration and followed by a drying step to obtain the final product in a powder form. The composition of the synthetic mixture is as follows: $SiO_2:0.034\ Al_2O_3:0.19\ Na_2O:2.3\ H_2O$. The mass ratio of seed crystals to the raw silicon source is 10%. It is determined by the X-ray diffraction analysis that the obtained product is a ZSM-5 zeolite.

Example 7

Synthesis of ZSM-5 Zeolite Using 1% Seed Crystals 1.5 g of $Na_2SiO_3.9H_2O$, 0.65 g of $Al_2(SO_4)_3.18H_2O$, 1.35 g of solid silica gel and 0.017 g of ZSM-5 seed crystals (the amount of seed crystals is calculated with respect to the amount of raw silicon source) were poured into a mortar and mixed by grinding for 10 minutes. The mixture than was transferred into a polytetrafluoroethylene lined stainless steel autoclave and the crystallization was conducted at 180° C. for 1 day until the crystallization was complete. The product was filtered by suction filtration and followed by a drying step to obtain the final product in a powder form. The composition of the synthetic mixture is as follows: $SiO_2:0.034\ Al_2O_3:0.19\ Na_2O:2.3\ H_2O$. The mass ratio of seed crystals to the raw silicon source is 1%. It is determined by the X-ray diffraction analysis that the obtained product is a ZSM-5 zeolite.

Example 8

Synthesis of ZSM-5 Zeolite Using 5% Seed Crystals 1.5 g of $Na_2SiO_3.9H_2O$, 0.65 g of $Al_2(SO_4)_3.18H_2O$, 1.35 g of solid silica gel and 0.085 g of ZSM-5 seed crystals (the amount of seed crystals is calculated with respect to the amount of raw silicon source) were poured into a mortar and mixed by grinding for 10 minutes. The mixture was then transferred into a polytetrafluoroethylene lined stainless steel autoclave and the crystallization was conducted at 180° C. for 20 hours until the crystallization was complete. The product was filtered by suction filtration and followed by a drying step to obtain the final product in a powder form. The composition of the synthetic mixture is as follows: $SiO_2:0.034\ Al_2O_3:0.19\ Na_2O:2.3\ H_2O$. The mass ratio of seed crystals to the raw silicon source is 5%. It is determined by the X-ray diffraction analysis that the obtained product is a ZSM-5 zeolite.

Example 9

Synthesis of Beta Zeolite at a Low Temperature by the Organotemplate-free Solid-state Method 6.34 g of $SiO_2.3H_2O$, 0.73 g of $NaAlO_2$, 0.48 g of NaOH and 0.34 g of Beta seed crystals (the amount of seed crystals is calculated with respect to the amount of raw silicon source) were poured into a mortar and mixed by grinding for 10 minutes. The mixture was then transferred into a polytetrafluoroethylene lined stainless steel autoclave and the crystallization was conducted at 120° C. for 10 days until the crystallization was complete. The product was filtered by suction filtration and followed by a drying step to obtain the final product in a powder form. The composition of the synthetic mixture is as follows: $SiO_2:0.056\ Al_2O_3:0.2\ Na_2O:3\ H_2O$. The mass ratio of seed crystals to the raw silicon source is 10%. It is determined by the X-ray diffraction analysis that the obtained product is a Beta zeolite.

Example 10

Synthesis of Beta Zeolite at a High Temperature by the Organotemplate-free Solid-state Method 6 g of SiO2.3H2O, 1.09 g of $NaAlO_2$, 0.19 g of NaOH and 0.4 g of Beta seed crystals (the amount of seed crystals is calculated with respect to the amount of raw silicon source) were poured into a mortar and mixed by grinding for 10 minutes. The mixture than was transferred into a polytetrafluoroethylene lined stainless steel autoclave and the crystallization was conducted at 140° C. for 3 days until the crystallization was complete. The product was filtered by suction filtration and followed by a drying step to obtain the final product in a powder form. The composition of the synthetic mixture is as follows: $SiO_2:0.083\ Al_2O_3:0.14\ Na_2O:2.5\ H_2O$. The mass ratio of seed crystals to the raw silicon source is 10%. It is determined by the X-ray diffraction analysis that the obtained product is a Beta zeolite.

Example 11

Synthesis of Beta Zeolite Using 5% Seed Crystals 6.34 g of $SiO_2.3H_2O$, 0.76 g of $NaAlO_2$, 0.45 g of NaOH and 0.17 g of Beta seed crystals (the amount of seed crystals is calculated with respect to the amount of raw silicon source) were poured into a mortar and mixed by grinding for 10 minutes. The mixture was then transferred into a polytetrafluoroethylene lined stainless steel autoclave and the crystallization was conducted at 120° C. for 15 days until the crystallization was complete. The product was filtered by suction filtration and followed by a drying step to obtain the final product in a powder form. The composition of the synthetic mixture is as follows: $SiO_2:0.06\ Al_2O_3:0.18\ Na_2O:3\ H_2O$. The mass ratio of seed crystals to the raw silicon source is 5%. It is determined by the X-ray diffraction analysis that the obtained product is a Beta zeolite.

Example 12

Synthesis of Beta zeolite using 1% seed crystals 6.34 g of $SiO_2.3H_2O$, 0.73 g of $NaAlO_2$, 0.48 g of NaOH and 0.034 g of Beta seed crystals (the amount of seed crystals is calculated with respect to the amount of raw silicon source) were poured into a mortar and mixed by grinding for 10 minutes. The mixture was then transferred into a polytetrafluoroethylene lined stainless steel autoclave and the crystallization was conducted at 120° C. for 20 days until the crystallization was complete. The product was filtered by suction filtration and followed by a drying step to obtain the final product in a powder form. The composition of the synthesis gel is as follows: $SiO_2:0.056\ Al_2O_3:0.19\ Na_2O:3\ H_2O$. The mass ratio of seed crystals to silicon source is 1%. It is determined by the X-ray diffraction analysis that the obtained product is a Beta zeolite.

Example 13

Synthesis of FAU Zeolite by the Organotemplate-free Solid-state Method 3.17 g of $SiO_2 \cdot 3H_2O$ and 1.64 g of $NaAlO_2$ were poured into a mortar and mixed by grinding for 10 minutes. The mixture was then transferred into a polytetrafluorethylene lined stainless steel autoclave and aged for 20 hours. The crystallization was conducted at 100° C. for 1 day until the crystallization was complete. The product was filtered by suction filtration and followed by a drying step to obtain the final product in a powder form. The composition of the synthetic mixture is as follows: $SiO_2:0.25\ Al_2O_3:0.39\ Na_2O:3\ H_2O$. It is determined by the X-ray diffraction analysis that the obtained product is a FAU zeolite.

Example 14

Synthesis of FAU Zeolite by the Organotemplate-free Solid-state Method 3 g of $SiO_2 \cdot 2.5H_2O$ and 1.64 g of $NaAlO_2$ were poured into a mortar and mixed by grinding for 10 minutes. The mixture was then placed into a polytetrafluoroethylene lined stainless steel autoclave and aged for 20 hours. The crystallization was conducted at 100° C. for 1 day until the crystallization was complete. The product was filtered by suction filtration and followed by a drying step to obtain the final product in a powder form. The composition of the synthetic mixture is as follows: $SiO_2:0.25\ Al_2O_3:0.39\ Na_2O:2.5\ H_2O$. It is determined by the X-ray diffraction analysis that the obtained product is a FAU zeolite.

Example 15

Synthesis of FAU Zeolite at a High Temperature by the Organotemplate-free Solid-state Method 2.67 g of $SiO_2 \cdot 2H_2O$ and 1.64 g of $NaAlO_2$ were poured into a mortar and mixed by grinding for 10 minutes. The mixture was then transferred into a polytetrafluorethylene lined stainless steel autoclave and aged for 20 hours. The crystallization was conducted at 120° C. for 12 hours until the crystallization was complete. The product was filtered by suction filtration and followed by a drying step to obtain the final product in a powder form. The composition of the synthetic mixture is as follows: $SiO_2:0.25\ Al_2O_3:0.39\ Na_2O:2\ H_2O$. It is determined by the X-ray diffraction analysis that the obtained product is a FAU zeolite.

Example 16

Synthesis of FAU Zeolite at a Low Temperature by the Organotemplate-free Solid-state Method 3.17 g of $SiO_2 \cdot 3H_2O$ and 1.64 g of $NaAlO_2$ were poured into a mortar and mixed by grinding for 10 minutes. The mixture was then placed into a polytetrafluoroethylene lined stainless steel autoclave and aged for 20 hours. The crystallization was conducted at 80° C. for 3 days until the crystallization was complete. The product was filtered by suction filtration and followed by a drying step to obtain the final product in a powder form. The composition of the synthetic mixture is as follows: $SiO_2:0.25\ Al_2O_3:0.39\ Na_2O:3\ H_2O$. It is determined by the X-ray diffraction analysis that the obtained product is a FAU zeolite.

Example 17

Synthesis of MOR Zeolite by the Organotemplate-free Solid-state Method 3.27 g of $SiO_2 \cdot 3H_2O$, 0.363 g of $NaAlO_2$ and 0.125 g of NaOH were poured into a mortar and mixed by grinding for 10 minutes. The mixture was then transferred into a polytetrafluorethylene lined stainless steel autoclave and the crystallization was conducted at 160° C. for 2.5 days until the crystallization was complete. The product was filtered by suction filtration and followed by a drying step to obtain the final product in a powder form. The composition of the synthetic mixture is as follows: $SiO_2:0.05\ Al_2O_3:0.15\ Na_2O:3\ H_2O$. It is determined by the X-ray diffraction analysis that the obtained product is a MOR zeolite.

Example 18

Synthesis of MOR Zeolite by the Organotemplate-free Solid-state Method 3 g of $SiO_2 \cdot 2.5H_2O$, 0.363 g of $NaAlO_2$ and 0.13 g of NaOH were poured into a mortar and mixed by grinding for 10 minutes. The mixture was then placed into a polytetrafluorethylene lined stainless steel autoclave and the crystallization was conducted at 160° C. for 2.5 days until the crystallization was complete. The product was filtered by suction filtration and followed by a drying step to obtain the final product in a powder form. The composition of the synthetic mixture is as follows: $SiO_2:0.05\ Al_2O_3:0.16\ Na_2O:2.5\ H_2O$. It is determined by the X-ray diffraction analysis that the obtained product is a MOR zeolite.

Example 19

Synthesis of MOR Zeolite at a Low Temperature by the Organotemplate-free Solid-state Method 3.17 g of $SiO_2 \cdot 3H_2O$, 0.363 g of $NaAlO_2$ and 0.125 g of NaOH were poured into a mortar and mixed by grinding for 10 minutes. The mixture was then placed into a polytetrafluorethylene lined stainless steel autoclave and the crystallization was conducted at 140° C. for 7 days until the crystallization was complete. The product was filtered by suction filtration and followed by a drying step to obtain the final product in a powder form. The composition of the synthetic mixture is as follows: $SiO_2:0.05\ Al_2O_3:0.15\ Na_2O:2\ H_2O$. It is determined by the X-ray diffraction analysis that the obtained product is a MOR zeolite.

Example 20

Synthesis of MOR Zeolite at a Relatively High Temperature by the Organotemplate-free Solid-state Method 3.17 g of $SiO_2 \cdot 3H_2O$, 0.363 g of $NaAlO_2$ and 0.08 g of NaOH were poured into a mortar and mixed by grinding for 10 minutes. The mixture was then transferred into a polytetrafluorethylene lined stainless steel autoclave and the crystallization was conducted at 180° C. for 1.5 days until the crystallization was complete. The product was filtered by suction filtration and followed by a drying step to obtain the final product in a powder form. The composition of the synthetic mixture is as follows:

$SiO_2$:0.05 $Al_2O_3$:0.1 $Na_2O$:2 $H_2O$. It is determined by the X-ray diffraction analysis that the obtained product is a MOR zeolite.

Example 21

Synthesis of GIS Zeolite by the Organotemplate-free Solid-state Method 2 g of $NaSiO_3$.$9H_2O$, 0.655 g of $NaAlO_2$ and 1.25 g of $SiO_2$ were poured into a mortar and mixed by grinding for 10 minutes. The mixture was then transferred into a polytetrafluorethylene lined stainless steel autoclave and the crystallization was conducted at 120° C. for 10 hours until the crystallization was complete. The product was filtered by suction filtration and followed by a drying step to obtain the final product in a powder form. The composition of the synthetic mixture is as follows:

$SiO_2$:0.1 $Al_2O_3$:0.39 $Na_2O$:2.5 $H_2O$. It is determined by the X-ray diffraction analysis that the obtained product is a GIS zeolite.

Example 22

Synthesis of GIS Zeolite by the Organotemplate-free Solid-state Method 1.7 g of $NaSiO_3$.$9H_2O$, 0.655 g of $NaAlO_2$ and 1.25 g of $SiO_2$ were poured into a mortar and mixed by grinding for 10 minutes. The mixture was then transferred into a polytetrafluorethylene lined stainless steel autoclave and the crystallization was conducted at 120° C. for 10 hours until the crystallization was complete. The product was filtered by suction filtration and followed by a drying step to obtain the final product in a powder form. The composition of the synthetic mixture is as follows:

$SiO_2$:0.1 $Al_2O_3$:0.39 $Na_2O$:2 $H_2O$. It is determined by the X-ray diffraction analysis that the obtained product is a GIS zeolite.

Example 23

Synthesis of GIS Zeolite by the Organotemplate-free Solid-state Method 2.5 g of $NaSiO_3$.$9H_2O$, 0.655 g of $NaAlO_2$ and 1.25 g of $SiO_2$ were poured into a mortar and mixed by grinding for 10 minutes. The mixture than was placed into a polytetrafluorethylene lined stainless steel autoclave and the crystallization was conducted at 120° C. for 10 hours until the crystallization was complete. The product was filtered by suction filtration and followed by a drying step to obtain the final product in a powder form. The composition of the synthetic mixture is as follows:

$SiO_2$:0.1 $Al_2O_3$:0.39 $Na_2O$:3 $H_2O$. It is determined by the X-ray diffraction analysis that the obtained product is a GIS zeolite.

Example 24

Synthesis of LTA Zeolite by the Organotemplate-free Solid-state Method 3.67 g of $SiO_2$.$4H_2O$ and 3.27 g of $NaAlO_2$ were poured into a mortar and mixed by grinding for 10 minutes. The mixture was then transferred into a polytetrafluorethylene lined stainless steel autoclave and the crystallization was conducted at 50° C. for 35 hours until the crystallization was complete. The product was filtered by suction filtration and followed by a drying step to obtain the final product in a powder form. The composition of the synthetic mixture is as follows:

$SiO_2$:0.5 $Al_2O_3$:0.69 $Na_2O$:4 $H_2O$. It is determined by the X-ray diffraction analysis that the obtained product is a LTA zeolite.

Example 25

Synthesis of LTA Zeolite by the Organotemplate-free Solid-state Method 3.17 g of $SiO_2$.$3H_2O$ and 3.27 g of $NaAlO_2$ were poured into a mortar and mixed by grinding for 10 minutes. The mixture was then transferred into a polytetrafluorethylene lined stainless steel autoclave and the crystallization was conducted at 50° C. for 35 hours until the crystallization was complete. The product was filtered by suction filtration and followed by a drying step to obtain the final product in a powder form. The composition of the synthetic mixture is as follows:

$SiO_2$:0.5 $Al_2O_3$:0.69 $Na_2O$:3 $H_2O$. It is determined by the X-ray diffraction analysis that the obtained product is a LTA zeolite.

Example 26

Synthesis of LTA Zeolite by the Organotemplate-free Solid-state Method 3.42 g of $SiO_2$.$3.5H_2O$ and 3.27 g of $NaAlO_2$ were poured into a mortar and mixed by grinding for 10 minutes. The mixture was then transferred into a polytetrafluorethylene lined stainless steel autoclave and the crystallization was conducted at 50° C. for 35 hours until the crystallization was complete. The product was filtered by suction filtration and followed by a drying step to obtain the final product in a powder form. The composition of the synthetic mixture is as follows:

$SiO_2$:0.5 $Al_2O_3$:0.69 $Na_2O$:3.5 $H_2O$. It is determined by the X-ray diffraction analysis that the obtained product is a LTA zeolite.

Example 27

Organotemplate-free Synthesis of Beta Zeolite without Addition of Water as Solvent 6.34 g of $SiO_2$.$3H_2O$ (hydrated form of solid silica gel), 0.73 g of $NaAlO_2$, 0.48 g of NaOH, and 0.34 g of Beta seeds were added together. After grinding for 10-20 minutes, the powder mixture was transferred to an autoclave and sealed. After heating at 120° C. for 9 days, the sample was completely crystallized. The H-form of the sample was prepared by ion-exchange with 1 M NH$_4$NO$_3$ solution and calcination at 500° C. for 4 hours. The ion-exchange procedure was repeated for 1 time.

Figure 16:
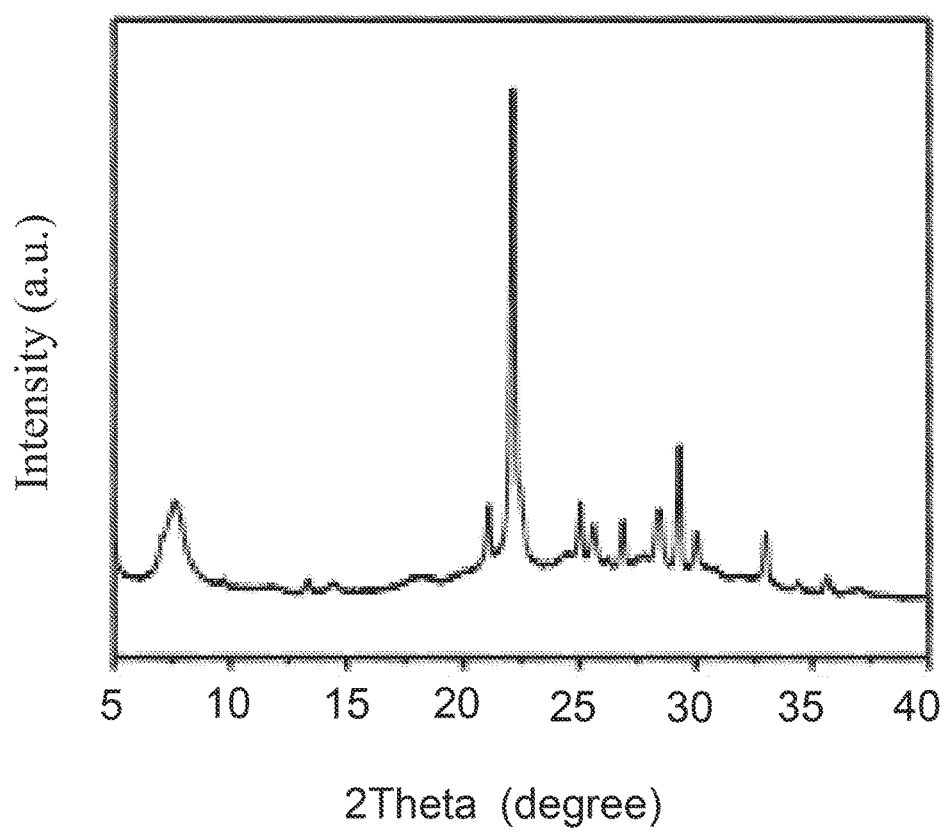
FIG. 16: XRD pattern of the as-synthesized product obtained according to Example 27.
Figure 17:
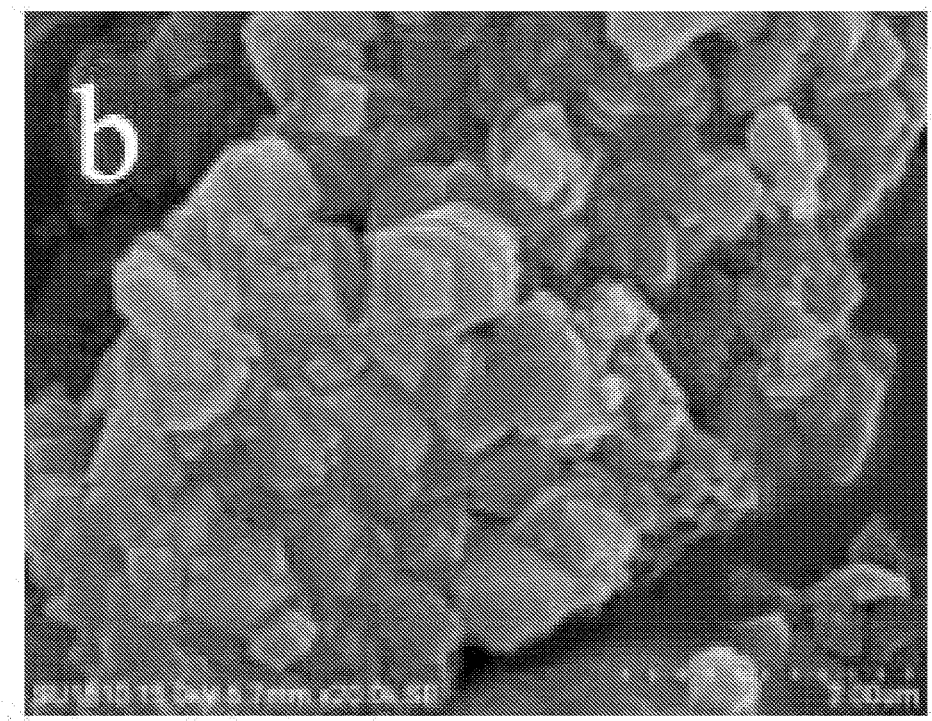
FIG. 17: SEM image of the as-synthesized product obtained according to Example 27.
Figure 18:
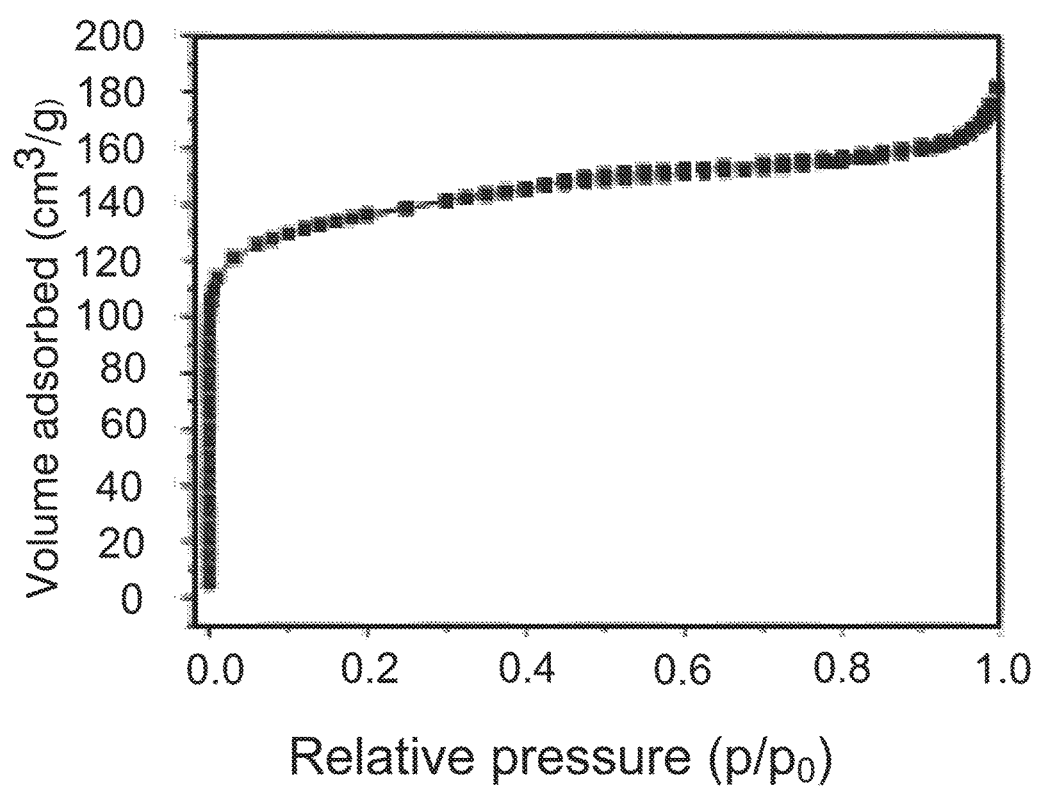
FIG. 18: $N_2$ sorption isotherms of the product (H-form) obtained according to Example 27.
Figure 19:
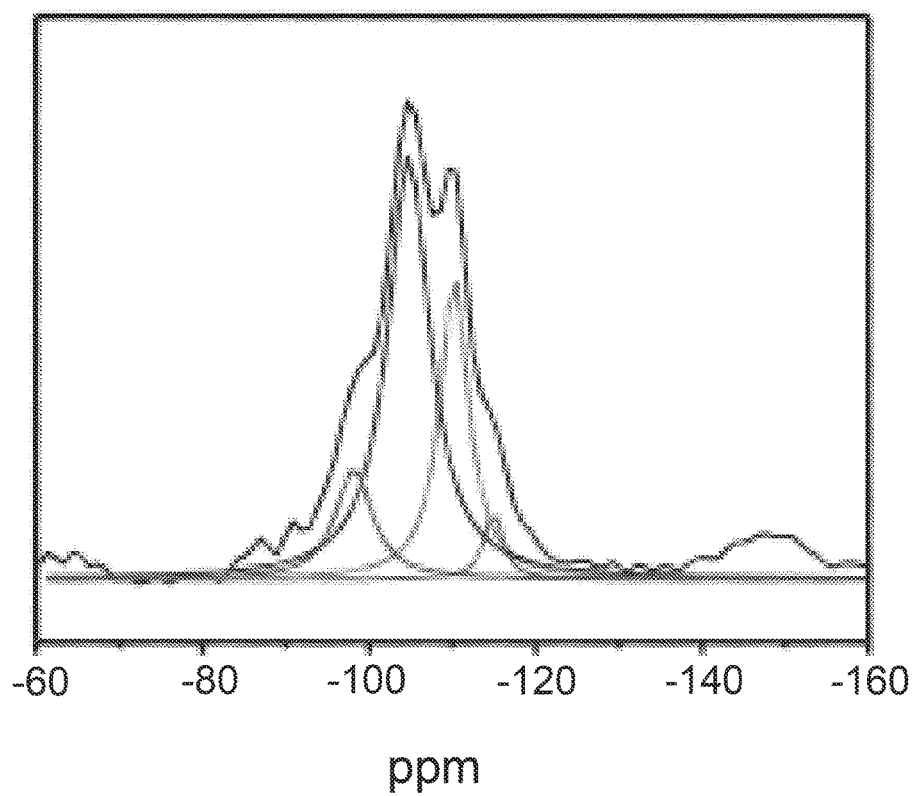
FIG. 19: $^{29}Si$ MAS NMR spectrum of the as-synthesized product obtained according to Example 27, including the result from deconvolution thereof.

FIGS. 16, 17, 18, and 19 respectively show XRD pattern, SEM image, N$_2$ sorption isotherms, and $^{29}$Si MAS NMR spectrum of Beta zeolite synthesized without addition of both organotemplate and water according to Example 27. The XRD pattern shows a series of characteristic peaks associated with BEA structure (FIG. 16). The SEM image exhibits almost perfect crystals (FIG. 17), confirming relatively high crystallinity. The N$_2$ sorption isotherm displays typical Langmuir-type curve (FIG. 18). Typical for microporous materials a steep increase at low relative pressure 10$^{-6}$<P/P$_0$<0.01, due to the filling of micropores by N$_2$ is observed. Correspondingly, the sample BET surface area and micropore volume are 464 m$^2$/g and 0.21 cm$^3$/g, respectively, in good agreement with those (445 m$^2$/g and 0.21 cm$^3$/g) of Beta zeolite synthesized in the presence of water under hydrothermal conditions. The $^{29}$Si NMR spectrum (FIG. 19) exhibits peaks at about −115.0, −110.3, −104.7 and −98.2 ppm. The peaks at −115 and −110.3 ppm are assigned to Si(4Si) species; the peak at −104.7 ppm is assigned to Si(3Si,1Al) and/or Si(3Si,1OH); the peak at −98.2 ppm is assigned to Si(2Si,2Al), Si(2Si,1Al,1OH), and/or Si(2Si, 2OH). ICP analysis shows that Si/Al ratio in the product is about 5.9.

Figure 24:
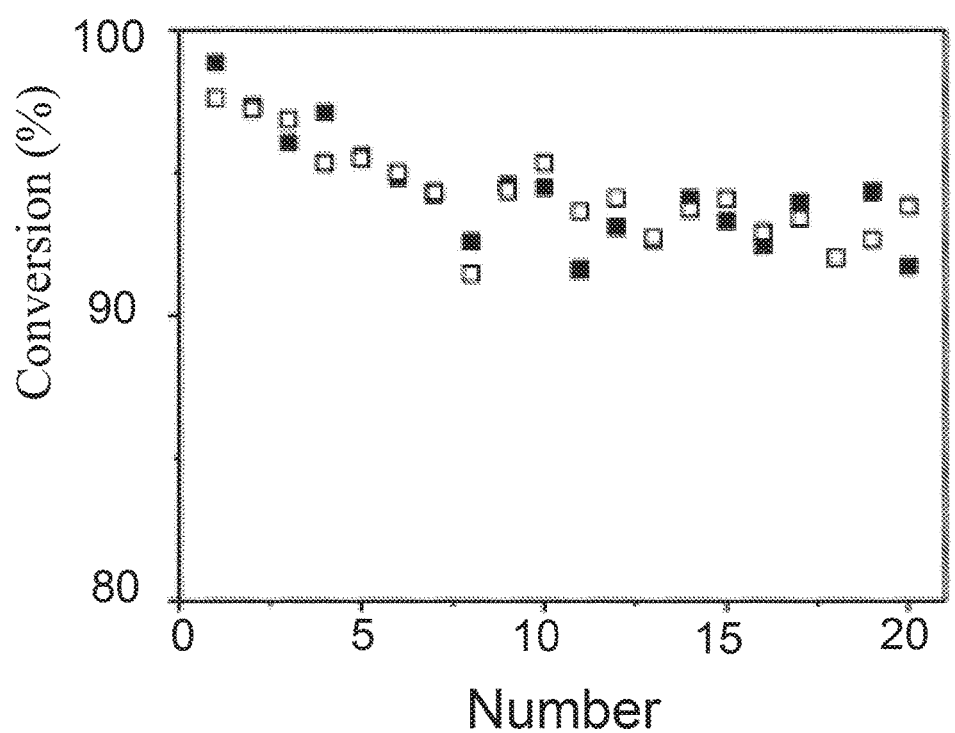
FIG. 24: Results from catalytic testing of Beta zeolite obtained from Example 27 ("□") and compared to conventional Beta zeolite ("■") in cumene cracking, wherein the abscissa indicates the conversion of cumene in %, whereas the ordinate indicates the run number in which one pulse injection was applied to the tested material.

Beta zeolite obtained from Example 27 was further tested with respect to its catalytic activity in cumene cracking, which was performed at 300° C. by pulse injections. In each run, 50 mg of the zeolite sample was used as the catalyst, the pulse injection of the reactant was 0.4 μmL, and the reaction flow rate was 55 mL/min. For comparison, a Beta zeolite sample obtained according to a conventional procedure employing an organotemplate was also tested under the same conditions. As may be taken from the results from catalytic testing of both samples under the given conditions which are displayed in FIG. 24, these reveal practically the same activity with respect to the conversion of cumene, thus indicating that Beta zeolite obtained from organotemplate-free synthesis without addition of water as solvent has comparable catalytic properties compared to conventional Beta zeolite.

Example 28

Organotemplate-free Synthesis of ZSM-5 Zeolite without Addition of Water as Solvent 1.5 g of NaSiO$_3$.9H$_2$O (SiO$_2$, 20 wt. %), 0.65 g of Al$_2$(SO$_4$)$_3$.18H$_2$O, 1.35 g of solid silica gel, and 0.17 g of ZSM-5 seeds were added together. After grinding for 10-20 minutes, the powder mixture was transferred to an autoclave and sealed. After heating at 180° C. for 13 hours, the sample was completely crystallized. The H-form of the sample was prepared from ion-exchange with 1 M NH$_4$NO$_3$ solution and calcination at 500° C. for 4 hours. The ion-exchange procedure was repeated for 1 time.

Figure 20:
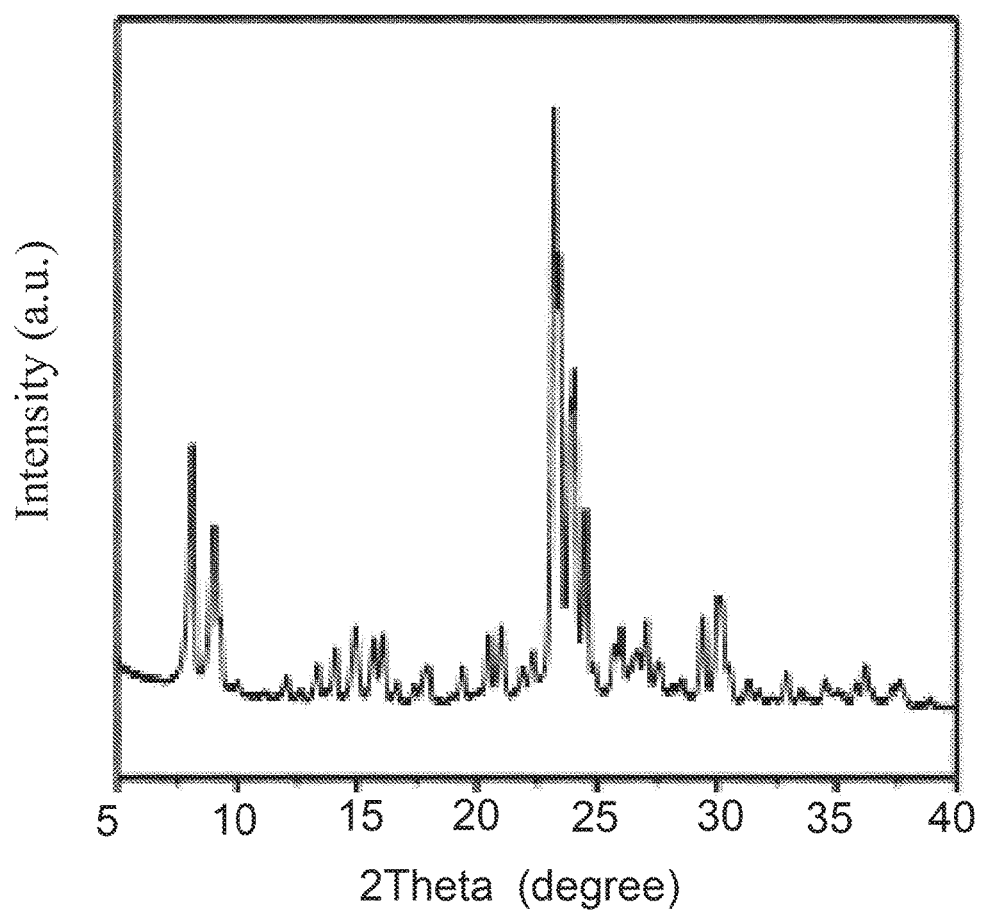
FIG. 20: XRD pattern of the as-synthesized product obtained according to Example 28.
Figure 21:
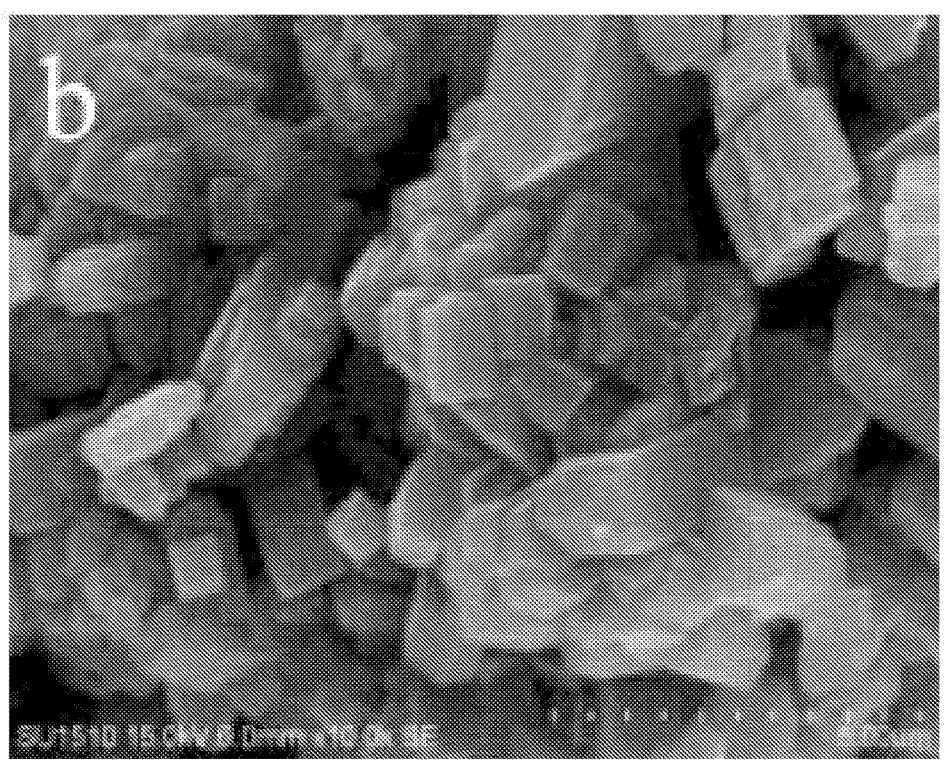
FIG. 21: SEM image of the as-synthesized product obtained according to Example 28.
Figure 22:
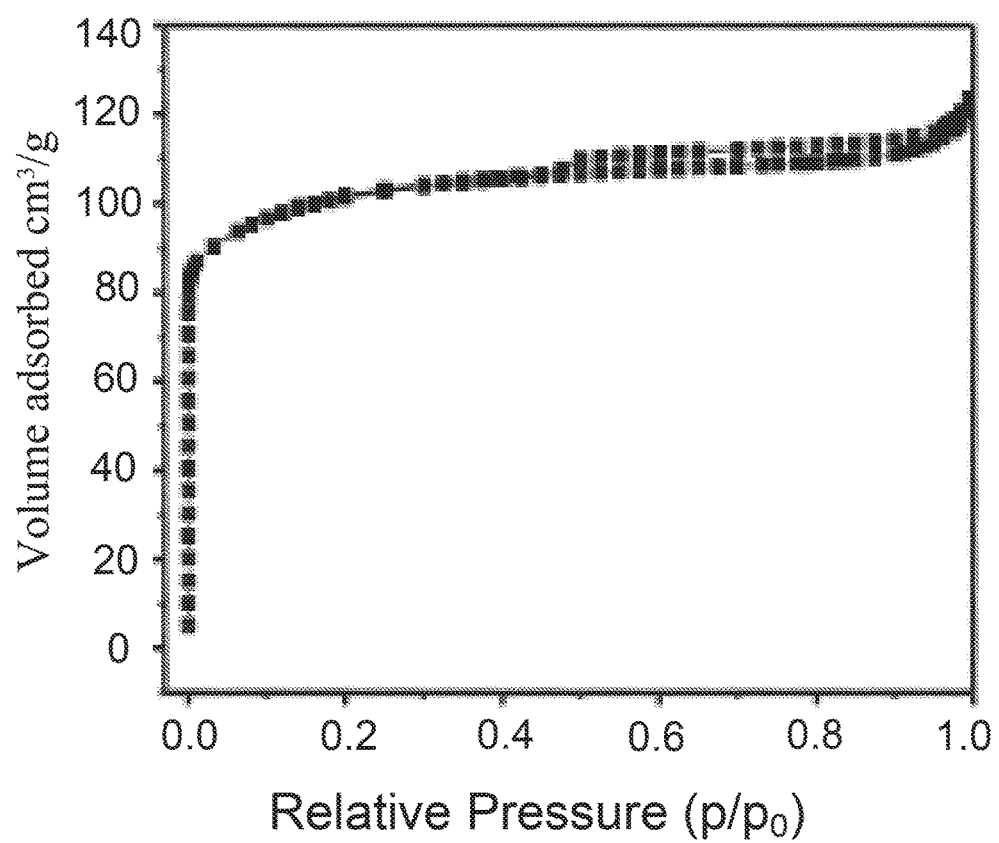
FIG. 22: $N_2$ sorption isotherms of the product (H-form) obtained according to Example 28.
Figure 23:
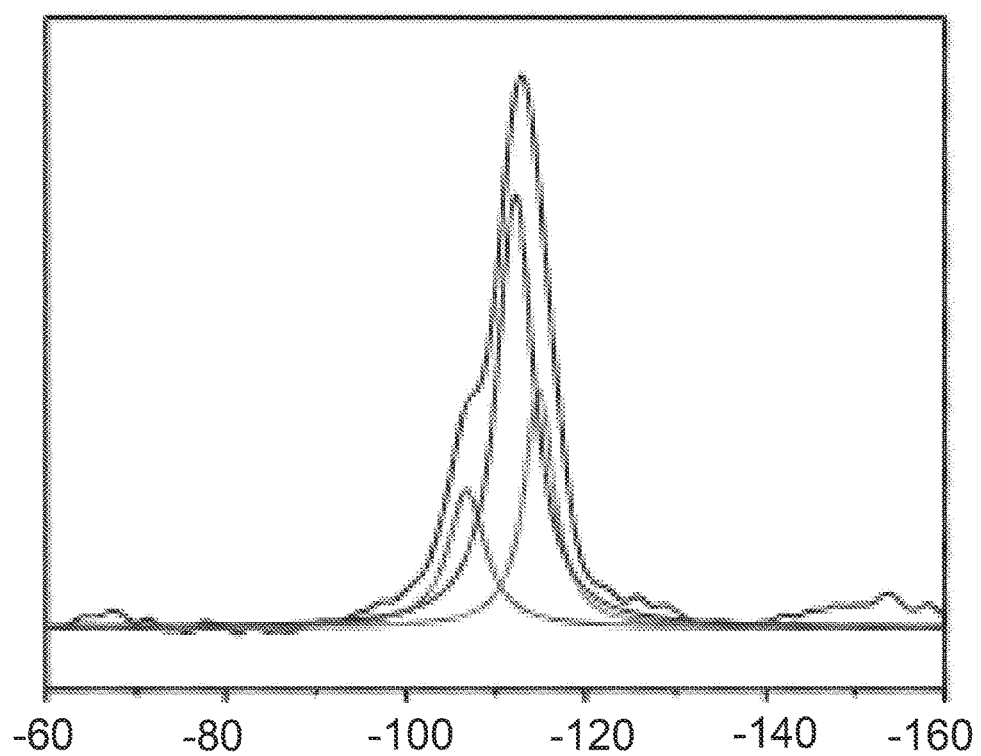
FIG. 23: $^{29}Si$ MAS NMR spectrum of the as-synthesized product obtained according to Example 28, including the result from deconvolution thereof.

FIGS. 20, 21, 22, and 23 respectively show XRD pattern, SEM image, N$_2$ sorption isotherms, and $^{29}$Si MAS NMR spectrum of ZSM-5 zeolite synthesized without addition of both organotemplate and water according to Example 28. The XRD pattern gives a series of characteristic peaks associated with MFI structure (FIG. 20). The SEM image shows typical MFI crystal morphology (FIG. 21). FIG. 22 shows N$_2$ sorption isotherms, giving Langmuir-type curve. Typical for microporous materials a steep increase at low relative pressure 10$^{-6}$<P/P$_0$<0.01, due to the filling of micropores by N$_2$ is observed The sample BET surface area and micropore volume are 345 m$^2$/g and 0.16 cm$^3$/g, which is comparable with those (350 m$^2$/g and 0.16 cm$^3$/g) of conventional MFI zeolite. The $^{29}$Si NMR spectrum (FIG. 23) shows signals at −114.8, −112.2, and −106.7 ppm. The peaks at −114.8 and −112.2 ppm are assigned to Si(4Si) species; the peak at −106.7 ppm is assigned to Si(3Si,1Al) and/or Si(3Si,1OH). ICP analysis shows that Si/Al ratio of S-ZSM-5 is about 13.

Figure 25:
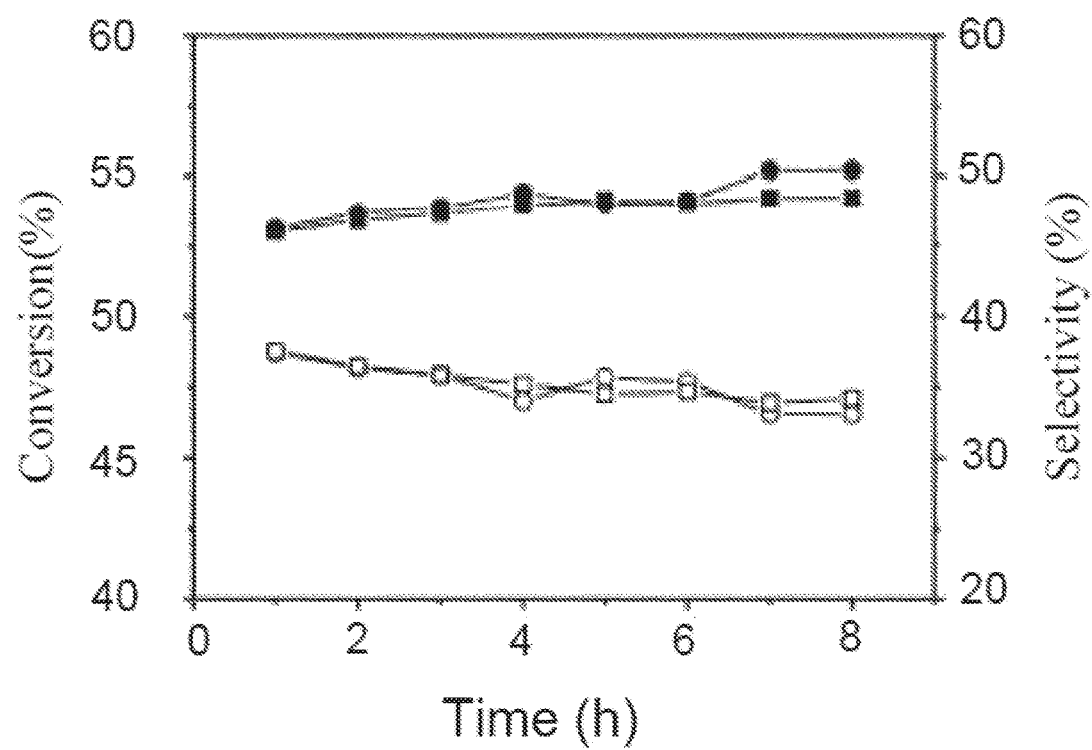
FIG. 25: Results from catalytic testing of ZSM-5 obtained from Example 28 compared to conventional ZSM-5 in the isomerization of m-xylene to p-xylene, wherein the abscissa to the left indicates the conversion of m-xylene in % for ZSM-5 obtained from Example 28 ("□") and conventional ZSM-5 ("○"), and the abscissa to the right indicates the selectivity of ZSM-5 obtained from Example 28 ("■") and conventional ZSM-5 ("●") towards the p-xylene product in %. The ordinate indicates the duration of the catalytic testing experiment in hours.

ZSM-5 obtained from Example 28 was further tested with respect to its catalytic activity in m-xylene isomerization to p-xylene, which was carried out in a fixed-bed reactor. The zeolite sample (200 mg, 20-40 mesh) was first activated in dry air at 450° C. for 2 h and then cooled to reaction temperature (350° C.) in a flow of dry nitrogen. m-xylene was fed (WHSV=3 h$^{-1}$) by a metering pump, vaporized in a preheated assembly and then passed through the catalyst. The product was analyzed by on-line gas chromatography (GC1690) with FID detector using HP-FFAP column. For comparison, a ZSM-5 sample obtained according to a conventional procedure employing an organotemplate was also tested under the same conditions. As may be taken from the results from catalytic testing of both samples under the given conditions which are displayed in FIG. 25, these reveal practically the same activity in the conversion of m-xylene, the same selectivity with respect to p-xylene, and a very similar catalyst lifetime, thus indicating that ZSM-5 obtained from organotemplate-free synthesis without addition of water as solvent has comparable catalytic properties compared to conventional Beta zeolite.

What is claimed is:

1. An organotemplate-free solid-state method for the synthesis of zeolite molecular sieves, the method comprising: grinding and mixing the weighed solid raw materials comprising the silicon source, the aluminum source and the alkali source; transferring the mixture into an autoclave; crystallizing the mixture at temperatures of between 50-200° C. for a time period of from 5 hours to 20 days; and filtering and drying the product for obtaining powders of molecular sieves; wherein each raw material is added within a molar ratio range of SiO$_2$:0.25 Al$_2$O$_3$:0.39 Na$_2$O:(2-3) H$_2$O.

2. The method of claim 1, wherein the aluminum source is selected from aluminum sulfate or sodium aluminate; the silicon source is selected from sodium silicate, solid silica gel, white carbon black or amorphous silica powder; and the alkali source is selected from sodium hydroxide or sodium silicate.

3. An organotemplate-free solid-state method for the synthesis of zeolite molecular sieves, the method comprising: grinding and mixing the weighed solid raw materials comprising the silicon source, the aluminum source and the alkali source; transferring the mixture into an autoclave; crystallizing the mixture at temperatures of between 50-200° C. for a time period of from 5 hours to 20 days; and filtering and drying the product for obtaining powders of molecular sieves; wherein each raw material is added within a molar ratio range of SiO$_2$:0.05 Al$_2$O$_3$:(0.1-0.16) Na$_2$O:(2-3) H$_2$O.

4. The method of claim 3, wherein the aluminum source is selected from aluminum sulfate or sodium aluminate; the silicon source is selected from sodium silicate, solid silica gel, white carbon black or amorphous silica powder; and the alkali source is selected from sodium hydroxide or sodium silicate.

5. An organotemplate-free solid-state method for the synthesis of zeolite molecular sieves, the method comprising: grinding and mixing the weighed solid raw materials comprising the silicon source, the aluminum source and the alkali source; transferring the mixture into an autoclave; crystallizing the mixture at temperatures of between 50-200° C. for a time period of from 5 hours to 20 days; and filtering and drying the product for obtaining powders of molecular sieves; wherein each raw material is added within a molar ratio range of $SiO_2$:0.1 $Al_2O_3$:0.39 $Na_2O$:(2-3) $H_2O$.

6. The method of claim 5, wherein the aluminum source is selected from aluminum sulfate or sodium aluminate; the silicon source is selected from sodium silicate, solid silica gel, white carbon black or amorphous silica powder; and the alkali source is selected from sodium hydroxide or sodium silicate.

7. An organotemplate-free solid-state method for the synthesis of zeolite molecular sieves, the method comprising: grinding and mixing the weighed solid raw materials comprising the silicon source, the aluminum source and the alkali source: transferring the mixture into an autoclave; crystallizing the mixture at temperatures of between 50-200° C. for a time period of from 5 hours to 20 days; and filtering and drying the product for obtaining powders of molecular sieves; wherein each raw material is added within a molar ratio range of $SiO_2$,:(0.056-0.083) $Al_2O_3$:(0.14-0.2) $Na_2O$:(2-3) $H_2O$: and wherein molecular sieve seed crystals are added and grinded together with the solid raw materials before crystallization, and wherein the mass ratio of the molecular sieve seed crystals to the raw silicon source is in a range of 1-10%.

8. The method of claim 7, wherein the aluminum source is selected from aluminum sulfate or sodium aluminate; the silicon source is selected from sodium silicate, solid silica gel, white carbon black or amorphous silica powder; and the alkali source is selected from sodium hydroxide or sodium silicate.

9. The method of claim 7, wherein each raw material is added within a molar ratio range of $SiO_2$:(0.056-0.083) $Al_2O_3$:(0.14-0.2) $Na_2O$:(2-3) $H_2O$.

* * * * *